US006094788A

United States Patent [19]
Farahmandi et al.

[11] Patent Number: 6,094,788
[45] Date of Patent: Aug. 1, 2000

[54] METHOD OF MAKING A MULTI-ELECTRODE DOUBLE LAYER CAPACITOR HAVING SINGLE ELECTROLYTE SEAL AND ALUMINUM-IMPREGNATED CARBON CLOTH ELECTRODES

[75] Inventors: C. Joseph Farahmandi, San Diego; John M. Dispennette, Oceanside; Edward Blank, San Diego; Alan C. Kolb, Rancho Santa Fe, all of Calif.

[73] Assignee: Maxwell Energy Products, Inc., San Diego, Calif.

[21] Appl. No.: 09/233,294

[22] Filed: Jan. 19, 1999

Related U.S. Application Data

[60] Division of application No. 08/726,728, Oct. 7, 1996, Pat. No. 5,862,035, which is a continuation-in-part of application No. 08/319,493, Oct. 7, 1994, Pat. No. 5,621,607.

[51] Int. Cl.[7] .................................................. H01G 7/00
[52] U.S. Cl. .................... 25/25.41; 29/25.03; 29/25.42; 361/502; 361/503; 429/129; 429/163
[58] Field of Search ..................... 29/25.41, 25.03, 29/25.42; 361/502, 503, 508, 512, 517, 518, 305, 301.5, 306.1, 307, 308, 309, 310; 429/34, 163, 46, 128, 129; 252/62.2

[56] References Cited

U.S. PATENT DOCUMENTS

| 2,800,616 | 7/1957 | Becker et al. | 317/230 |
|---|---|---|---|
| 3,105,178 | 9/1963 | Meyers | 317/262 |

(List continued on next page.)

FOREIGN PATENT DOCUMENTS

| 660854 | 4/1964 | Canada | 29/25.41 |
|---|---|---|---|
| 0112923 | 6/1983 | European Pat. Off. . | |
| 0134706 | 8/1984 | European Pat. Off. . | |

(List continued on next page.)

OTHER PUBLICATIONS

Cheng, et al.; "Preparation of Carbon Fibre Reinforced Aluminum Via Ultrasonic Liquid Infiltration Technique", *Materials Science and Technology*, 9, pp. 609–614 (Jul. 1993).

(List continued on next page.)

*Primary Examiner*—Jessica J. Harrison
*Assistant Examiner*—Minh Trinh
*Attorney, Agent, or Firm*—Fitch, Even, Tabin & Flannery

[57] ABSTRACT

A method of making a double layer capacitior includes first and second flat stacks of electrodes adapted to be housed in a closeable two-part capacitor case which includes only a single electrolyte seal. Each electrode stack has a plurality of electrodes connected in parallel, with the electrodes of one stack being interleaved with the electrodes of the other stack to form an interleaved stack, and with the electrodes of each stack being electrically connected to respective capacitor terminals. A porous separator is positioned against the electrodes of one stack before interleaving to prevent electrical shorts between the electrodes. The electrodes are made by folding a compressible, low resistance, aluminum-impregnated carbon cloth, made from activated carbon fibers, around a current collector foil, with a tab of the foils of each electrode of each stack being connected in parallel and connected to the respective capacitor terminal. The height of the interleaved stack is somewhat greater than the inside height of the closed capacitor case, thereby requiring compression of the interleaved electrode stack when placed inside of the case, and thereby maintaining the interleaved electrode stack under modest constant pressure. The closed capacitor case is filled with an electrolytic solution and sealed. A preferred electrolytic solution is made by dissolving an appropriate salt into acetonitrile ($CH_3CN$). In one embodiment, the two arts of the capacitor case are conductive and function as the capacitor terminals.

27 Claims, 15 Drawing Sheets

U.S. PATENT DOCUMENTS

| | | | |
|---|---|---|---|
| 3,536,963 | 10/1970 | Boos | 317/230 |
| 3,648,126 | 3/1972 | Boos et al. | 317/230 |
| 3,652,902 | 3/1972 | Hart et al. | 317/230 |
| 3,700,975 | 10/1972 | Butherus et al. | 317/230 |
| 4,313,084 | 1/1982 | Hosokawa et al. | 323/370 |
| 4,327,400 | 4/1982 | Muranaka et al. | 361/433 |
| 4,438,481 | 3/1984 | Phillips et al. | 361/433 |
| 4,562,511 | 12/1985 | Nishino et al. | 361/324 |
| 4,597,028 | 6/1986 | Yoshida et al. | 361/305 |
| 4,622,611 | 11/1986 | Bennett et al. | 361/433 |
| 4,709,303 | 11/1987 | Fujiwara et al. | 361/433 |
| 4,724,927 | 2/1988 | Morimoto et al. | 361/433 |
| 5,065,286 | 11/1991 | Kurabayashi et al. | 361/502 |
| 5,072,335 | 12/1991 | Kurabayashi et al. | 361/502 |
| 5,072,336 | 12/1991 | Kurabayashi et al. | 361/502 |
| 5,072,337 | 12/1991 | Kurabayashi et al. | 361/502 |
| 5,080,963 | 1/1992 | Tatarchuk et al. | 428/225 |
| 5,086,373 | 2/1992 | Kurabayashi et al. | 361/502 |
| 5,096,663 | 3/1992 | Tatarchuk | 419/11 |
| 5,099,398 | 3/1992 | Kirabayashi et al. | 361/502 |
| 5,102,745 | 4/1992 | Tatarchuk et al. | 428/605 |
| 5,121,301 | 6/1992 | Kurabayashi et al. | 361/502 |
| 5,136,472 | 8/1992 | Tsuchiya et al. | 361/502 |
| 5,142,451 | 8/1992 | Kurabayashi et al. | 361/502 |
| 5,150,283 | 9/1992 | Yoshida et al. | 361/502 |
| 5,219,673 | 6/1993 | Kaun | 429/32 |
| 5,227,960 | 7/1993 | Kunishi et al. | 361/502 |
| 5,304,330 | 4/1994 | Tatarchuk et al. | 264/61 |
| 5,450,279 | 9/1995 | Yoshida et al. | 361/502 |
| 5,649,982 | 7/1997 | Halliop | 29/25.03 |
| 5,682,288 | 10/1997 | Wani | 361/502 |
| 5,859,761 | 1/1999 | Aoki et al. | 361/502 |
| 5,862,035 | 1/1999 | Farahmandi et al. | 361/502 |
| 5,907,472 | 5/1999 | Farahmandi et al. | 361/502 |

FOREIGN PATENT DOCUMENTS

| | | |
|---|---|---|
| 0207167 | 12/1985 | European Pat. Off. . |
| 0680061 | 3/1995 | European Pat. Off. . |
| 55-99714 | 7/1980 | Japan . |
| 59-4114 | 1/1984 | Japan . |
| 59-105312 | 6/1984 | Japan . |
| 63-261817 | 10/1988 | Japan . |
| 64001220 | 1/1989 | Japan . |
| 64001222 | 1/1989 | Japan . |
| 153524 | 3/1989 | Japan . |
| 1201908 | 8/1989 | Japan . |
| 1298712 | 12/1989 | Japan . |
| 266917 | 3/1990 | Japan . |
| 2177525 | 7/1990 | Japan . |
| 2248025 | 10/1990 | Japan . |
| 2297915 | 12/1990 | Japan . |
| 256805 | 12/1990 | Japan . |
| 3038815 | 2/1991 | Japan . |
| 3141629 | 6/1991 | Japan . |
| 3-289116 | 12/1991 | Japan . |
| 465814 | 3/1992 | Japan . |
| 4206914 | 7/1992 | Japan . |
| 4206916 | 7/1992 | Japan . |
| 5299295 | 11/1993 | Japan . |
| 6275469 | 6/1994 | Japan . |

OTHER PUBLICATIONS

Foster, et al.; "New Highly Conductive Inorganic Electrolytes", *J. Electrochem. Soc.*, pp. 2682–2686, (Nov. 1988).

Farahmandi, et al.; "Optimization of Carbon Fibers Used in Electrochemical Capacitors for Electric Vehicle Applications", *The 36th Power Sources Conference*, Cherry Hill, New Jersey, pp. 23–26 (Jun. 6–9, 1994).

Farahmandi, et al.; "Bipolar Electrochemical Capacitors Based on Organic Electrolytes for Electric Vehicle Applications", *The Fourth International Seminar on Double Layer Capacitors and Similar Energy Storage Devices*, Boca Raton, Florida, (Dec. 12–14, 1994).

Farahmandi, et al.; "A Comparison of Electrochemical Capacitors Using Organic and Aqueous Electrolytic Solutions for Electric Vehicle Applications", *Third International Seminar on Double Layer Capacitors and Similar Energy Storage Devices*, Deerfield Beach, Florida, (Dec. 6–8, 1993).

Fujii; "KYNOL Novoloid Fibers", *Informational Brochure*, (1990).

*Technical Notes*, "The Charcoal Cloth", (1987).

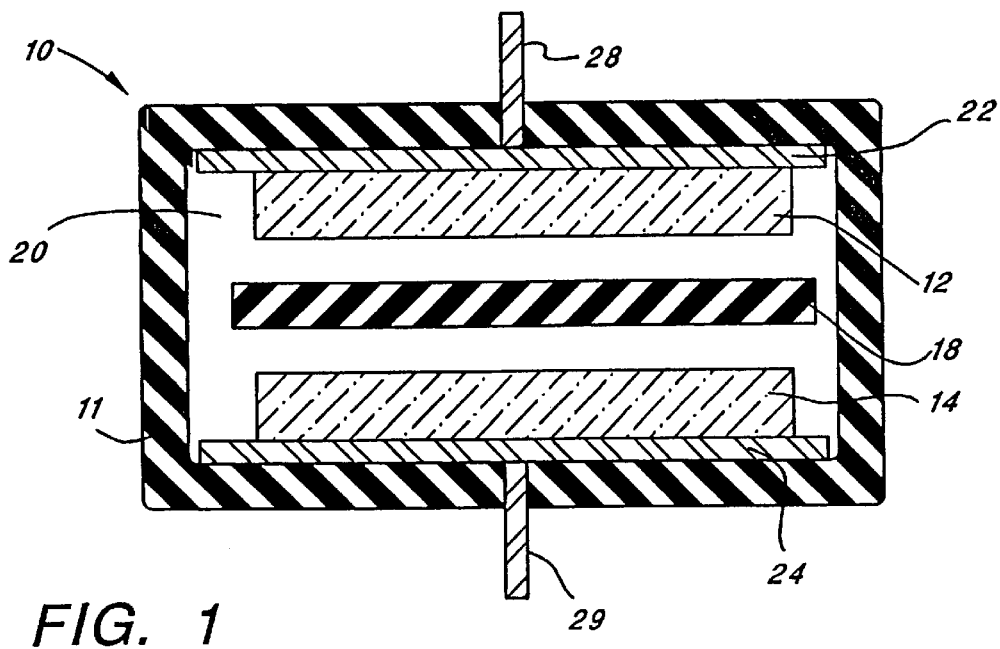
FIG. 1
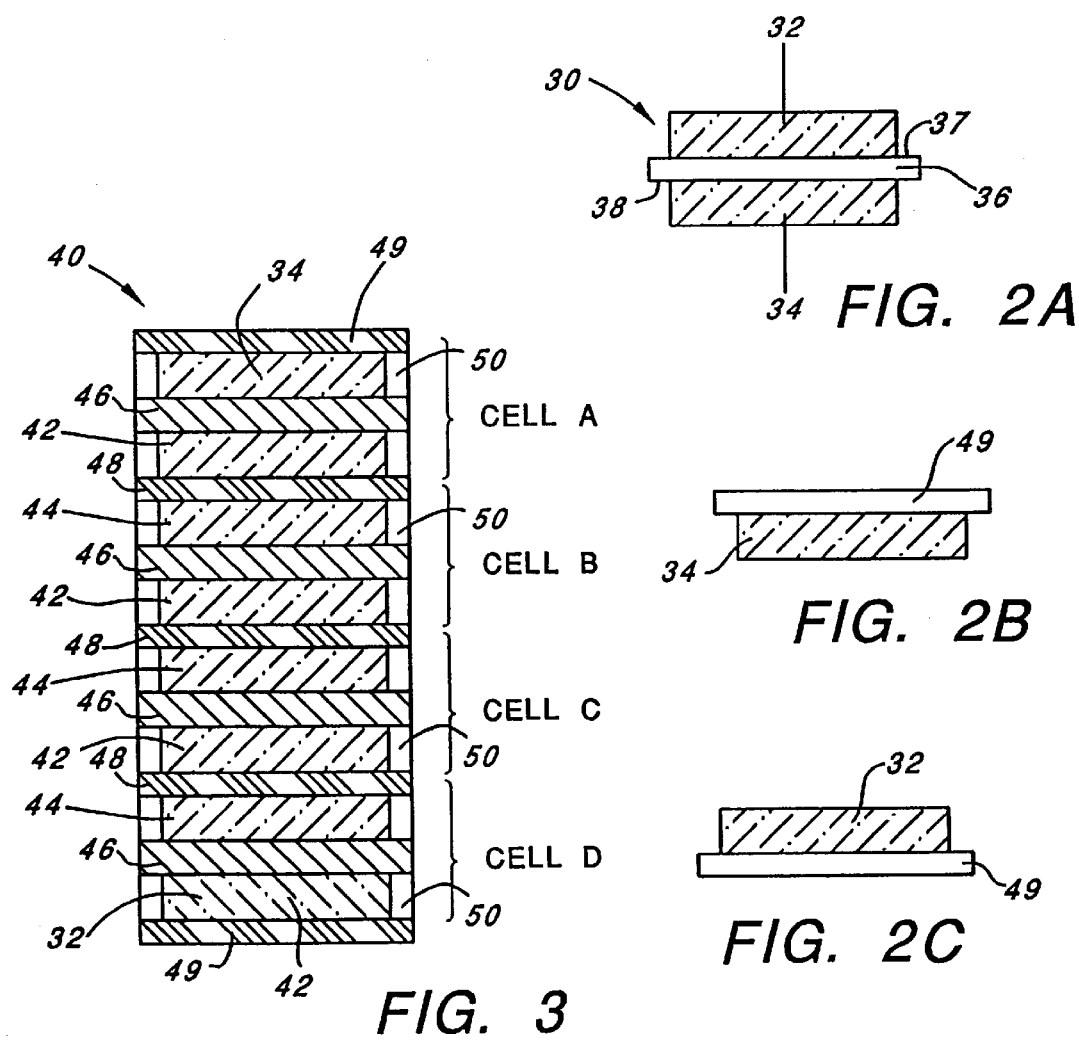
FIG. 2A
FIG. 2B
FIG. 2C
FIG. 3

$R_C$ = CONTACT RESISTANCE $R_{EL}$ = ELECTRODE RESISTANCE $R_{ES}$ = ELECTROLYTE SOLUTION RESISTANCE $R_{SEP}$ = SEPARATOR RESISTANCE $R_C$ = CONTACT RESISTANCE
$R_{EL}$ = ELECTRODE RESISTANCE
$R_{ES}$ = SOLUTION RESISTANCE
$R_{SEP}$ = SEPARATOR RESISTANCE

GOAL: REDUCE TRANSVERSE RESISTANCE BY IMPREGNATING ALUMINUM DEEP INTO TOW OF EACH BUNDLE AT SURFACE POINTS OF CLOTH

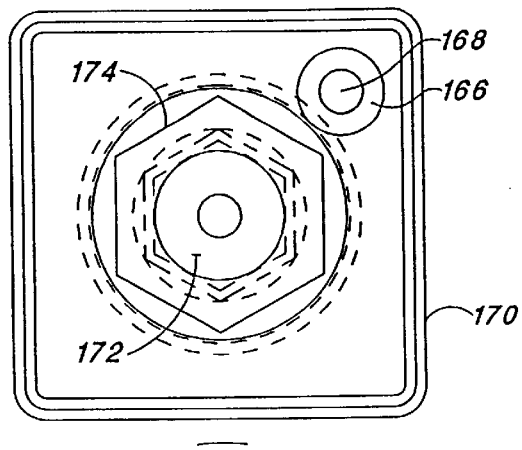
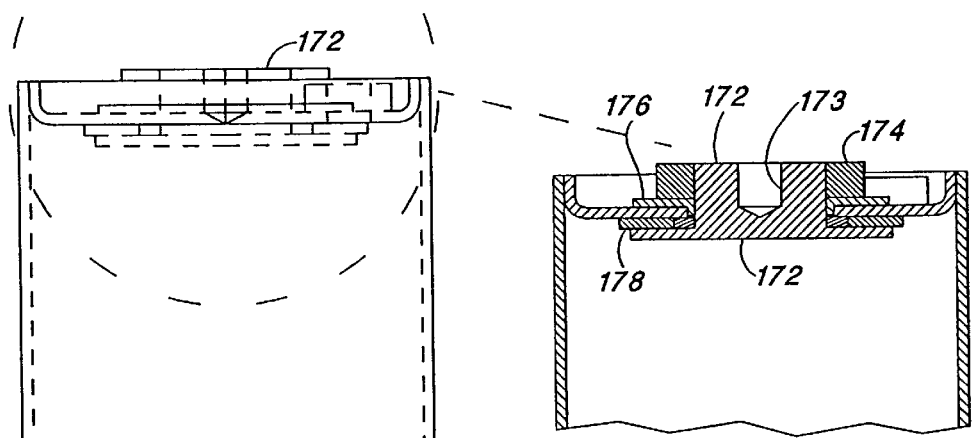
FIG. 13B
FIG. 13C
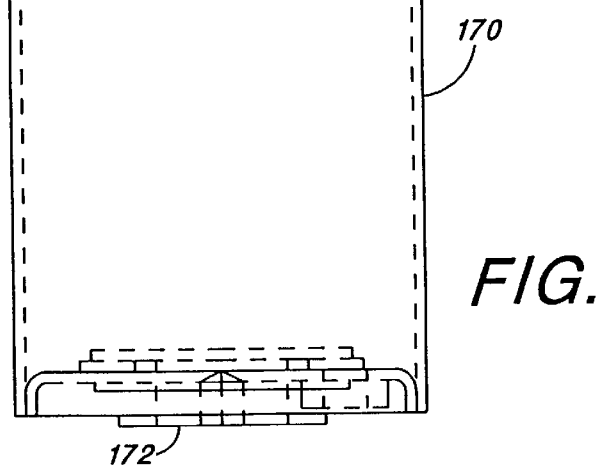
FIG. 13A

METHOD OF MAKING A MULTI-ELECTRODE DOUBLE LAYER CAPACITOR HAVING SINGLE ELECTROLYTE SEAL AND ALUMINUM-IMPREGNATED CARBON CLOTH ELECTRODES

This application is a Divisional application of application Ser. No. 08/726,728, filed Oct. 7, 1996 to Farahmandi, et al., entitled MULTI-ELECTRODE DOUBLE LAYER CAPACITOR HAVING SINGLE ELECTROLYTE SEA AND ALUMINUM-IMPREGNATED CARBON CLOTH ELECTRODES, now U.S. Pat. No. 5,862,035, issuing concurrently herewith; which is a Continuation-In-Part of U.S. patent application Ser. No. 08/319,493, filed Oct. 7, 1994, to Farahmandi, et al., entitled MULTI-ELECTRODE DOUBLE LAYER CAPACITOR HAVING SINGLE ELECTROLYTE SEAL AND ALUMINUM-IMPREGNATED CARBON CLOTH ELECTRODES now U.S. Pat. No. 5,621,607.

The invention described herein may be subject to limited Government rights and licenses pursuant to the Government Waiver of Invention Rights under Department of Energy (DOE) SubContract EGG-C91-103647.

BACKGROUND OF THE INVENTION

The present invention relates generally to an electric double layer capacitor, and more particularly to a high performance double layer capacitor made with low-resistance aluminum-impregnated carbon-cloth electrodes and a high performance electrolytic solution.

Double layer capacitors, also referred to as electrochemical capacitors, are energy storage devices that are able to store more energy per unit weight and unit volume than traditional capacitors. In addition, they can typically deliver the stored energy at a higher power rating than rechargeable batteries. Double layer capacitors consist of two porous electrodes that are isolated from electrical contact by a porous separator. Both the separator and the electrodes are impregnated with an electrolytic solution. This allows ionic current to flow between the electrodes through the separator at the same time that the separator prevents an electrical or electronic (as opposed to an ionic) current from shorting the cell. Coupled to the back of each of the active electrodes is a current collecting plate. One purpose of the current collecting plate is to reduce ohmic losses in the double layer capacitor. If these current collecting plates are non-porous, they can also be used as part of the capacitor seal.

Double layer capacitors store electrostatic energy in a polarized liquid layer which forms when a potential exists between two electrodes immersed in an electrolyte. When the potential is applied across the electrodes, a double layer of positive and negative charges is formed at the electrode-electrolyte interface (hence, the name "double layer" capacitor) by the polarization of the electrolyte ions due to charge separation under the applied electric field, and also due to the dipole orientation and alignment of electrolyte molecules over the entire surface of the electrodes.

The use of carbon electrodes in electrochemical capacitors with high power and energy density represents a significant advantage in this technology because carbon has a low density and carbon electrodes can be fabricated with very high surface areas. Fabrication of double layer capacitors with carbon electrodes has been known in the art for quite some time, as evidenced by U.S. Pat. No. 2,800,616 (Becker), and U.S. Pat. No. 3,648,126 (Boos et al.).

A major problem in many carbon electrode capacitors, including double layer capacitors, is that the performance of the capacitor is often limited because of the high internal resistance of the carbon electrodes. This high internal resistance may be due to several factors, including the high contact resistance of the internal carbon-carbon contacts, and the contact resistance of the electrodes with a current collector. This high resistance translates to large ohmic losses in the capacitor during the charging and discharge phases, which losses further adversely affect the characteristic RC (resistance×capacitance) time constant of the capacitor and interfere with its ability to be efficiently charged and/or discharged in a short period of time. There is thus a need in the art for lowering the internal resistance, and hence the time constant, of double layer capacitors.

Various electrode fabrication techniques have been disclosed over recent years. For example, the Yoshida et al. patent (U.S. Pat. No. 5,150,283) discloses a method of connecting a carbon electrode to a current collector by depositing carbon powder and other electrical conductivity-improving agents on an aluminum substrate.

Another related approach for reducing the internal resistance of carbon electrodes is disclosed in U.S. Pat. No. 4,597,028 (Yoshida et al.) which teaches that the incorporation of metals such as aluminum into carbon fiber electrodes can be accomplished through weaving metallic fibers into carbon fiber preforms.

Yet another approach for reducing the resistance of a carbon electrode is taught in U.S. Pat. No. 4,562,511 (Nishino et al.) wherein the carbon fiber is dipped into an aqueous solution to form a layer of a conductive metal oxide, and preferably a transition metal oxide, in the pores of the carbon fibers. Nishino et al. also discloses the formation of metal oxides, such as tin oxide or indium oxide by vapor deposition.

Still another related approach for achieving low resistance is disclosed in U.S. Pat. Nos. 5,102,745, 5,304,330, and 5,080,963 (Tatarchuk et al.). The Tatarchuk et al. patents demonstrate that metal fibers can be intermixed with a carbon preform and sintered to create a structurally stable conductive matrix which may be used as an electrode. The Tatarchuk et al. patents also teach a process that reduces the electrical resistance in the electrode by reducing the number of carbon-carbon contacts through which current must flow to reach the metal conductor. This approach works well if stainless steel or nickel fibers are used as the metal. However, applicants have learned that this approach has not been successful when aluminum fibers are used because of the formation of aluminum carbide during the sintering or heating of the electrode.

Another area of concern in the fabrication of double layer capacitors relates to the method of connecting the current collector plate to the electrode. This is important because the interface between the electrode and the current collector plate is another source of internal resistance of the double layer capacitor, and such internal resistance must be kept as low as possible.

U.S. Pat. No. 4,562,511 (Nishino et al.) suggests plasma spraying of molten metals such as aluminum onto one side of a polarizable electrode to form a current collector layer on the surface of the electrode. Alternative techniques for bonding and/or forming the current collector are also considered in the '511 Nishino et al. patent, including arc-spraying, vacuum deposition, sputtering, non-electrolytic plating, and use of conductive paints.

The previously-cited Tatarchuk et al. patents (U.S. Pat. Nos. 5,102,745, 5,304,330, and 5,080,963) show the bonding of a metal foil current collector to the electrode by sinter bonding the metal foil to the electrode element.

U.S. Pat. No. 5,142,451 (Kurabayashi et al.) discloses a method of bonding the current collector to the surface of the electrode by a hot curing process which causes the material of the current collectors to enter the pores of the electrode elements.

Still other related art concerned with the method of fabricating and adhering current collector plates can be found in U.S. Pat. Nos. 5,065,286; 5,072,335; 5,072,336; 5,072,337; and 5,121,301 all issued to Kurabayashi et al.

It is thus apparent that there is a continuing need for improved double layer capacitors. Such improved double layer capacitors need to deliver large amounts of useful energy at a very high power output and energy density ratings Within a relatively short period of time. Such improved double layer capacitors should also have a relatively low internal resistance and yet be capable of yielding a relatively high operating voltage.

Furthermore, it is also apparent that improvements are needed in the techniques and methods of fabricating double layer capacitor electrodes so as to lower the internal resistance of the double layer capacitor and maximize the operating voltage. Since capacitor energy density increases with the square of the operating voltage, higher operating voltages thus translate directly into significantly higher energy densities and, as a result, higher power output ratings. It is thus readily apparent that improved techniques and methods are needed to lower the internal resistance of the electrodes used within a double layer capacitor and increase the operating voltage.

SUMMARY OF THE INVENTION

The present invention addresses the above and other needs by providing a high performance double layer capacitor having multiple electrodes wherein the multiple electrodes are made from activated carbon that is volume impregnated with aluminum in order to significantly reduce the internal electrode resistance by decreasing the contact resistance between the activated carbon elements. More particularly, the high performance double layer capacitor of the present invention includes at least one pair of aluminum-impregnated carbon electrodes, each being formed by volume impregnating an activated carbon preform (i.e., a carbon cloth) with aluminum, or other suitable metal, e.g., titanium, with each electrode being separated from the other by a porous separator, and with both electrodes being saturated with a high performance electrolytic solution.

In accordance with one aspect of the invention, a high performance double layer capacitor is provided that is made as a single cell, multi-electrode capacitor. By "single cell", it is meant that only one electrolytic solution seal is required, even though multiple parallel-connected aluminum-impregnated carbon electrodes are utilized. Such a single cell multi-electrode double layer capacitor, in one embodiment, includes first and second flat stacks of composite electrodes adapted to be housed in a closeable two-part capacitor case. Advantageously, the case represents the only component of the capacitor that must be sealed to prevent electrolyte leakage. Each electrode stack has a plurality of aluminum-impregnated carbon electrodes connected in parallel, with the electrodes of one stack being interleaved with the electrodes of the other stack to form an interleaved stack, and with the electrodes of each stack being electrically connected to respective capacitor terminals. A porous separator is positioned against the electrodes of one stack before interleaving to prevent electrical shorts between the electrodes when they are interleaved. In an alternative embodiment, the electrodes and separator may be spirally wound rather than interleaved in flat stacks.

The electrodes are preferably made by folding a compressible, very low resistance, metal-impregnated carbon cloth (the cloth being made from activated carbon fibers) around a current collector foil. In the flat stack embodiment, the current collector foils of each respective stack are connected in parallel to each other and to the respective capacitor terminal. In the spirally wound embodiment, the current collector foil of each electrode is connected to the respective capacitor terminal. The preferred metal that is impregnated into the carbon cloth comprises aluminum, although other metals may also be used, e.g., titanium. For the flat stack embodiment, the height of the unconfined interleaved stack is by design somewhat greater than the inside height of the closed capacitor case, thereby requiring a slight compression of the interleaved electrode stack when placed inside of the case. This slight compression advantageously maintains the interleaved electrode stack under a modest constant pressure (e.g., 10 psi) while held inside of the case. In the spiral wound embodiment, the winding of the electrodes requires a slight radial compression in order to fit within the closed capacitor case. In either embodiment, the modest pressure helps assure a low contact resistance between the current collector foils and the aluminum-impregnated carbon cloth electrodes. The closed capacitor case is filled with an appropriate electrolytic solution and sealed. A preferred electrolytic solution is made by dissolving an selected salt into acetonitrile ($CH_3CN$).

In accordance with another aspect of the invention, the two parts of the capacitor case may be conductive and insulated from each other when the capacitor case is assembled, thereby allowing each half of the case to function as the capacitor terminal.

One embodiment of a high performance double layer capacitor made as described herein exhibits a capacitance of about 2400 Farads, an energy density in the range of 2.9 to 3.5 W-hr/kg at an operating voltage of 2.3 volts, a power rating of about 1000 W/kg at a 400 ampere discharge, an electrode resistance of about 0.8 milliohms (m$\Omega$), and a time constant of about 2 seconds. Such performance parameters, to applicants' knowledge, represent a significant and remarkable advance over what has heretofore been available in the double layer capacitor art.

In accordance with yet another aspect of the invention, the flat stack capacitor design lends itself to multi-electrode scale up or scale down in order to meet the needs of a particular double layer capacitor application. Thus, by simply increasing or decreasing the size and number of composite electrodes that are used within the interleaved electrode stack, and by making appropriate scaled changes in the physical parameters (size, weight, volume) of the capacitor, it is possible to provide a high performance double layer capacitor that is tailored to a specific application. With such a capacitor, the door is thus opened to a wide variety of applications wherein relatively large amounts of energy must be stored and retrieved from a compact storage device in a relatively short period of time. Similar scaling is also readily achievable using the spiral-wound embodiment.

The present invention is further directed to improved methods of making a high performance double layer capacitor. Such methods include, e.g., impregnating molten aluminum into a commercially-available carbon cloth comprising a weave of bundles of activated carbon fibers. The transverse resistance of the carbon cloth is reduced dramatically, e.g., by a factor of fifty, by impregnating molten aluminum deep into the tow of the fiber bundles. The aluminum-impregnated carbon cloth serves as the key component of each electrode within the double layer capacitor. Electrical contact is made with the impregnated carbon cloth by way of a foil current collector which contacts the impregnated side of the cloth on both sides of the foil, i.e., the impregnated cloth is folded around the foil current collector so that both sides of the foil current collector contact the impregnated side of the folded cloth. The contact resistance between the foil current collector and the carbon cloth is reduced by applying pressure to the impregnated cloth prior to assembly within the capacitor to smooth out the hills and valleys at the impregnated surface, thereby increasing the surface area which contacts the foil current collector.

The large surface area provided by the carbon cloth of each composite electrode used with the invention may be multiplied many times by interleaving a large number of such composite electrodes, e.g., 54 electrodes. The interleaved aluminum-impregnated electrodes are separated by a suitable porous separator which provides electrical insulation between the electrodes, yet permits the ions of an electrolytic solution to readily pass therethrough. The foil current collectors of alternating electrodes, e.g., the foil current collectors of 27 of the electrodes, are electrically connected in parallel and connected to a suitable capacitor terminal. Similarly, the foil current collectors of the remaining electrodes are also electrically connected in parallel and connected to the other capacitor terminal. The interleaved stack of electrodes is then sealed in a suitable capacitor case, which case maintains the interleaved stack under a modest pressure to reduce the contact resistance. The inside of the case is then evacuated and dried, and filled with a highly conductive non-aqueous electrolytic solution made from a suitable solvent mixed with a specified salt.

Accordingly, it is a feature of the present invention to provide a high performance double layer capacitor, and method of making such capacitor, having a relatively high energy density of greater than about 3.4 W-hr/kg at an operating voltage of 2.3 volts.

It is another feature of the invention to provide an improved double layer capacitor having a maximum useable power density of greater than about 1000 W/kg.

It is a further feature of the invention to provide an improved double layer capacitor having a low internal resistance in combination with a high capacitance such that the characteristic RC time constant of the capacitor remains at a value which allows for relatively rapid charge/discharge times. For example, in one embodiment, the resistance of the capacitor is less than about 0.9 mΩ, while the capacitance is at least 2350 Farads, thereby allowing the charging and discharging of the capacitor (into a zero impedance load, or short) to occur at a time constant of about 2 seconds.

Another important feature of the invention is the identified use of advanced non-aqueous electrolytic solutions that allow higher operating voltages of the capacitor. A preferred electrolytic solution is, for example, mixed using an acetonitrile ($CH_3CN$) solvent, and a suitable salt, which electrolyte allows a nominal operating voltage of 2.3 volts, with peak voltages of up to 3.0 volts or higher.

BRIEF DESCRIPTION OF DRAWINGS

The above and other aspects, features, and advantages of the present invention will be more apparent from the following more particular description thereof, presented in conjunction with the following drawings and Appendix, wherein:

FIG. 1 a sectional view of a single cell high performance double layer capacitor made in accordance with the present invention;

FIG. 2A is a sectional representation of a bipolar aluminum/carbon composite electrode made in accordance with the invention;

FIG. 2B illustrates an upper portion of a bipolar stack;

FIG. 2C illustrates a lower portion of a bipolar stack;

FIG. 3 is a sectional representation of a series bipolar stack of high performance bipolar type double layer capacitors of the type shown in FIG. 2A;

FIGS. 13A, 13B and 13C illustrate top, end, and end-sectional views, respectively, of an alternative capacitor case which may use either a conductive or a non-conductive case having capacitor terminals at each end of the case;

Figure 4A:
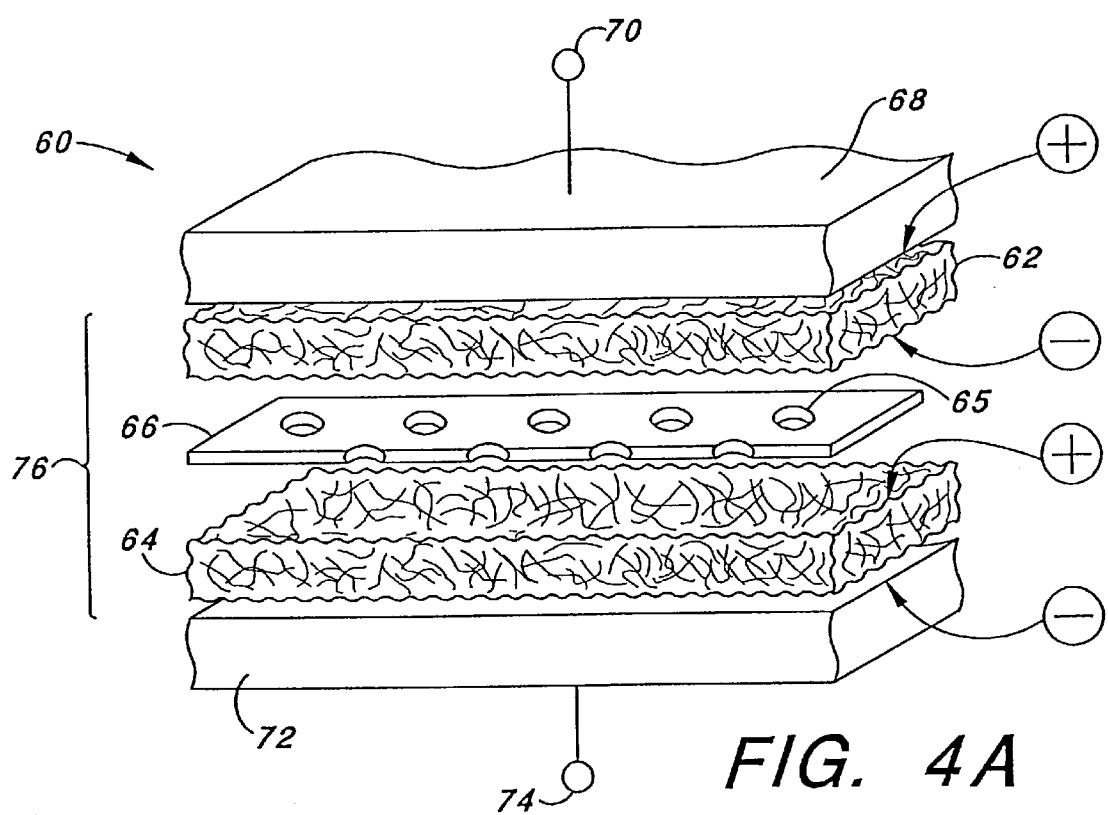
FIG. 4A schematically shows a basic double layer capacitor made in accordance with the invention.

Appendix A sets forth the presently-used acceptance test procedures to test the performance a capacitor after fabrication and assembly in accordance with FIGS. 10A–12 and 14A and 14B.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Referring to FIG. 1, a single cell, high performance double layer capacitor 10 is illustrated including a cell holder 11, a pair of aluminum/carbon composite electrodes 12 and 14, an electronic separator 18, an electrolyte 20, a pair of current collector plates 22 and 24, and electrical leads 28 and 29, extending from the current collector plates 22 and 24.

The pair of aluminum/carbon composite electrodes 12 and 14 are preferably formed from a porous carbon cloth preform or carbon paper preform which is impregnated with molten aluminum. The porosity of the aluminum/carbon composite electrodes 12 and 14 must be closely controlled during the impregnation process to subsequently permit a sufficient amount of the electrolyte 20 to be introduced into the double layer capacitor 10 and penetrate the pores of the carbon fibers.

The pair of current collector plates 22 and 24 are attached to the back of each aluminum/carbon composite electrode 12 and 14. Preferably, the current collector plates 22 and 24 are thin layers of aluminum foil.

An electronic separator 18 is placed between the opposing aluminum/carbon composite electrodes 12 and 14. The electronic separator 18 is preferably made from a highly porous material which acts as an electronic insulator between the aluminum/carbon composite electrodes 12 and 14. The purpose of the electronic separator 18 is to assure that the opposing electrodes 12 and 14 are never in contact with one another. Contact between electrodes results in a short circuit and rapid depletion of the charges stored in the electrodes. The porous nature of the electronic separator 18 allows movement of the ions in the electrolyte 20. The preferred electronic separator 18 is a porous polypropylene or polyethylene sheet approximately 1 mil (0.001 inches) thick. If desired, the polypropylene or polyethylene separator may be initially soaked in the electrolyte 20 prior to inserting it between the aluminum/carbon composite electrodes 12 and 14, although such pre-soaking is not required.

The cell holder 11 may be any known packaging means commonly used with double layer capacitors. A preferred type of packaging, using upper and lower shells that are fastened together, is described hereinafter. In order to maximize the energy density of the double layer capacitors, it is an advantage to minimize the weight of the packaging means. Packaged double layer capacitors are typically expected to weigh not more than 25 percent of the unpackaged double layer capacitor. Electrical leads 28 and 29 extend from the current collector plates 22 and 24 through the cell holder 11 and are adapted for connection with an electrical circuit (not shown).

A bipolar aluminum/carbon composite electrode 30, as shown in FIG. 2A, may be utilized in combination with end portions as shown in FIGS. 2B and 2C in a corresponding series stack of such electrodes to form a high performance bipolar double layer capacitor 40 as shown in FIG. 3. The aluminum/carbon composite electrode 30 (FIG. 2A) comprises a polarized aluminum/carbon composite body separated with a non-porous current collector plate 36. Attached to one surface 37 of the current collector plate 36 is a charged electrode 32 for a first electrode. Attached to the opposite surface 38 of the current collector plate 36, is an oppositely charged electrode 34. Such electrode structure may then be stacked as shown in FIG. 3, with a series stack of the bipolar capacitors as shown in FIG. 2A being stacked between the two end portions of the stack shown in FIGS. 2B and 2C, thereby forming a bipolar double layer capacitor 40. As seen in FIG. 3, if the first electrode 34 is a negative electrode for a first capacitor cell "A", the second (or bottom) electrode of cell "A", electrode 42, becomes oppositely charged, i.e., becomes a positive electrode. The same charge of electrode 42 carries over to a first electrode 44 of cell "B", i.e., electrode 44 of cell "B" becomes positively charged relative to electrode 34. This causes the bottom electrode 42 of cell "B" to become oppositely charged, i.e., negatively charged relative to electrode 44 of cell "B". A series stack of the high performance bipolar double layer capacitors 40 thus includes a plurality of cells (A, B, C, and D) which are connected in series. Each cell includes a pair of aluminum impregnated carbon composite porous electrodes. Cell "A" includes electrodes 34 and 42 facing one another with an ionically conductive separator 46 disposed between them. Cells "B" and "C" include electrodes 44 and 42 facing one another with an ionically-conductive separator 46 disposed between them. Cell "D" includes electrodes 44 and 32 facing one another with an ionically-conductive separator 46 disposed between them. A plurality of internal non-porous current collectors 48 are placed between each cell, having two adjoining polarized electrodes 42 and 44 on each side thereof. Exterior current collecting plates 49 are placed at each end of the stack. A sufficient amount of an electrolyte 50 is introduced within each cell such that the electrolyte 50 saturates the composite electrodes 32, 34, 42 or 44 and separator 46 within each cell.

The individual carbon electrode structures 32, 34, 42 and/or 44 are preferably formed in a manner similar to the process described elsewhere herein. Each electrode structure is fabricated from a carbon cloth preform or carbon paper preform which is volume impregnated with molten aluminum. As is explained more fully below, such impregnation serves to significantly reduce the electrode resistance.

More particularly, each of the electrode structures 32, 34, 42 and/or 44 is fabricated from a carbon cloth preform or carbon paper preform which is impregnated with molten aluminum. The porosity of the electrode structures 32, 34, 42 and/or 44 should be controlled during the impregnation process to subsequently permit a sufficient amount of the electrolyte 50 to be introduced into the capacitor cell and penetrate the pores of the carbon fibers.

The aluminum impregnated carbon composite electrodes 32, 34, 42 and/or 44 are sufficiently porous, and preferably have a sufficient aluminum impregnant within the activated carbon fibers such that the equivalent series resistance of each electrode when used in a 2.3–3.0 volt cell is about 1.5

$\Omega cm^2$ or less, and the capacitance of each composite electrode 42 and 44 is approximately 30 F/g or greater. Such large capacitance is achievable due to the large surface area made available through the use of activated carbon fibers, and the very small separation distance between the capacitor layers, as explained more fully below.

The internal current collector plates 48 of each bipolar electrode are preferably non-porous layers of aluminum foil designed to separate the electrolyte 50 between adjacent cells. The exterior current collecting plates 49 are also non-porous such that they can be used as part of the external capacitor seal, if necessary.

An electronic separator 46 is placed between the opposing the electrode structures 42 and 44 within a particular internal capacitor cell, or between opposing electrode structures 34 and 42, or 44 and 32, of end capacitor cells. The electronic separator 46 is preferably a porous polypropylene or polyethylene sheet.

Many of the attendant advantages of the present double layer capacitor result from the preferred methods of fabricating the carbon electrode structures, the preferred method of connecting the current collector, and the use of high performance electrolytes. Each of these aspects of the invention are discussed in further detail below.

As identified above, the carbon electrode structure is preferably made from a porous carbon fiber cloth preform or carbon fiber paper preform which is impregnated with molten aluminum. The preform can be fabricated from any suitable activated carbon fiber material such as carbon fiber felt or other activated carbon fiber substrates having a sufficient porosity to receive the impregnated molten aluminum and electrolytic solution.

The aluminum is volumetrically impregnated deep into the tow of the bundles of carbon fibers within the carbon cloth, as explained more fully below in connection with FIGS. 9A and 9B. The result of impregnating the aluminum into the tow of the fibrous carbon bundles is a low resistance current path between the activated carbon elements within the electrode. However, with the low resistance current path, the electrode structure also remains sufficiently porous so that an electrolytic solution, preferably a non-aqueous electrolytic solution, infiltrates the pores of the activated carbon fibers.

The fabrication process of the aluminum/carbon composite electrodes of the double layer capacitor starts with the fabrication of a carbon fiber electrode preform. The carbon fiber electrode preform is typically manufactured paper or cloth preform using high surface area carbon fibers. The preferred carbon fiber preform is carbon fiber cloth. The carbon fiber cloth preform is preferably a commercially available cloth which uses woven carbon fibers also having a surface area of approximately 500 to 3000 $m^2/g$ and a diameter of approximately 8–10 $\mu m$. The carbon fiber cloth preform is typically has more structural stability than the carbon fiber paper preform. The surface area and other dimensions of the carbon fibers, however, can be tailored to meet the requirements of the application in which it is used.

Impregnation of the carbon fiber cloth with molten aluminum is preferably accomplished using a plasma spraying technique, as described more fully below in connection with FIGS. 8A and 8B. Plasma spraying molten metal onto the surface of a carbon fiber preform has previously been used in double layer capacitor construction as a means for forming a current collector at the surface of the carbon fiber preform. However, to applicants' knowledge, plasma spraying has never been done to volume impregnate the carbon fiber preform with the sprayed metal so as to reduce the contact resistance between the activated carbon elements, thereby forming a very low resistance carbon/metal composite electrode made up of both the activated carbon and the impregnated metal.

The plasma spray technique is controlled to penetrate into the carbon fiber cloth preform as described more fully below in connection with FIGS. 9A and 9B. Control is accomplished by adjusting the electrical current to the spray unit, the temperature and pressure of the molten aluminum, the distance of the plasma spray unit from the carbon fiber preform, the sweep of the plasma spray unit, and the ambient airflow during the spraying process. Advantageously, the bulk resistivity of the carbon cloth is dramatically reduced when plasma spraying is used to impregnate the carbon cloth with aluminum, as described more fully below.

Additional details and information regarding the bipolar double layer capacitor stack shown in FIG. 3, and the electrodes used therein, may be found in Applicants' co-pending patent application, Ser. No. 08/319,493, filed Oct. 7, 1994, which application is incorporated herein by reference.

Single Cell, Multi-Electrode Double Layer Capacitor

At this point, a more detailed description of a single cell, multi-electrode double layer capacitor will be presented in conjunction with a more detailed description of FIGS. 4A through 16B. A key feature of such capacitor, as will become more apparent from the description that follows, is the use of multiple electrodes (or, in the preferred embodiment, a "flat stack" of electrodes) connected in parallel within a capacitor package that requires only a single electrolyte seal. Because only one electrolyte seal is required, it is appropriate to refer to such capacitor as a "single cell" capacitor since it is the electrolyte seal which normally defines what comprises a cell. Such a single cell, multi-electrode double layer capacitor configuration represents the best mode for practicing the invention at the present time. It is to be emphasized, however, that the invention is not intended to be limited to such mode or embodiment. Rather, it is contemplated that the invention extend to all double layer capacitors that use low-resistance carbon electrodes in conjunction with aluminum of the type described herein, regardless of the specific electrode configuration that may eventually be used to make the capacitor, and regardless of the specific high conductivity electrolytic solution that is employed. Such electrode configurations may include, e.g., multiple electrodes connected in parallel in a single cell (as is described more fully herein); a pair of electrodes arranged in a spiral pattern in a single cell; electrodes connected in series in stacked cells; or other electrode configurations.

Turning to FIG. 4A, a schematic representation of a two-electrode single cell double layer capacitor 60 made in accordance with the present invention is illustrated. The capacitor includes two spaced apart aluminum-impregnated carbon electrodes 62 and 64 electrically separated by a porous separator 66. The electrodes 62 and 64, as explained in more detail below, comprise a relatively dense weave of activated carbon fibers, forming a carbon cloth, in which molten aluminum has been impregnated.

The electrode 62 is in contact with a current collector plate 68, which plate 68 is in turn connected to a first electrical terminal 70 of the capacitor 60. Similarly, the electrode 64 is in contact with another current collector plate 72, which plate 72 is connected to a second electrical terminal 74 of the capacitor 60. The region between the electrodes 62 and 64, as well as all of the available spaces and voids within the electrodes 62 and 64, are filled with a highly conductive non-aqueous electrolytic solution 76. The ions of the electrolytic solution 76 are free to pass through pores or holes 65 of the separator 66; yet the separator 66 prevents the electrode 62 from physically contacting, and hence electrically shorting with, the electrode 64. A preferred separator, for example, is polypropylene. Polypropylene includes rectangular-shaped pore openings having dimensions on the order of 0.04 by 0.12 μm. This size pore prevents the fibers of the carbon cloth, which have a diameter on the order of 8–10 μm, from poking through the pores. Another suitable separator material is polyethylene. Polyethylene generally has pore sizes on the order of 0.1 μm diameter or less, thereby also preventing carbon fibers having a minimum diameter of 8 μm from poking therethrough.

In operation, when an electrical potential is applied across the terminals 70 and 74, and hence across the series-connected electrodes 62 and 64, a polarized liquid layer forms at each electrode immersed in the electrolyte. It is these polarized liquid layers which store electrostatic energy and function as the double layer capacitor—i.e., that function as two capacitors in series. More particularly, as conceptually depicted in FIG. 4A by the "+" and "−" symbols (representing the electrical charge at the electrode-electrolyte interface of each electrode that is immersed in the electrolyte), when a voltage is applied across the electrodes, e.g., when electrode 62 is charged positive relative to electrode 64, a double layer is formed (symbolically depicted by the two "±" layers shown in FIG. 4A) by the polarization of the electrolyte ions due to charge separation under the applied electric field and also due to the dipole orientation and alignment of electrolyte molecules over the entire surface of the electrodes. This polarization stores energy in the capacitor according to the following relationships:

$$C = k_e A/d \quad (1)$$

and $$E = CV^2/2 \quad (2)$$

where C is the capacitance, $k_e$ is the effective dielectric constant of the double layer, d is the separation distance between the layers, A is the surface area of the electrodes that is immersed in the electrolytic solution, V is the voltage applied across the electrodes, and E is the energy stored in the capacitor.

In a double layer capacitor, the separation distance d is measured is so small that it is measured in angstroms, while the surface area A, i.e., the surface area "A" per gram of electrode material, may be very large. Hence, as can be seen from Eq. (1), when d is very small, and A is very large, the capacitance will be very large.

The surface area "A" is large because of the make-up of the electrodes, each electrode comprising a weave of activated carbon fiber bundles to form a carbon cloth. The activated carbon fibers do not have a smooth surface, but are pitted with numerous holes and pores 80, as suggested by FIG. 4B. That is, FIG. 4B conceptually illustrates a small section of an activated carbon fiber 78 having numerous pits or holes 80 therein. The fiber 78, as previously indicated, typically has a diameter on the order of 8–10 μm; while the pits or holes of the activated carbon fiber have a typical size of about 40 angstroms. The fiber 78 is immersed in an electrolytic solution 76. Each pit or hole 80 significantly increases the surface area of the fiber that is exposed to the electrolytic solution 76. Because there are a large number of fibers 80 in each bundle, and because there are several bundles within the weave that form the carbon cloth, the result is a three-dimensional electrode structure which allows the electrolyte to penetrate into the weave of the fibers and contact all, or most all, of the surface area of the fibers, thereby dramatically increasing the surface area "A" of the electrode over which the double layer of charged molecules is formed.

Figure 4B:
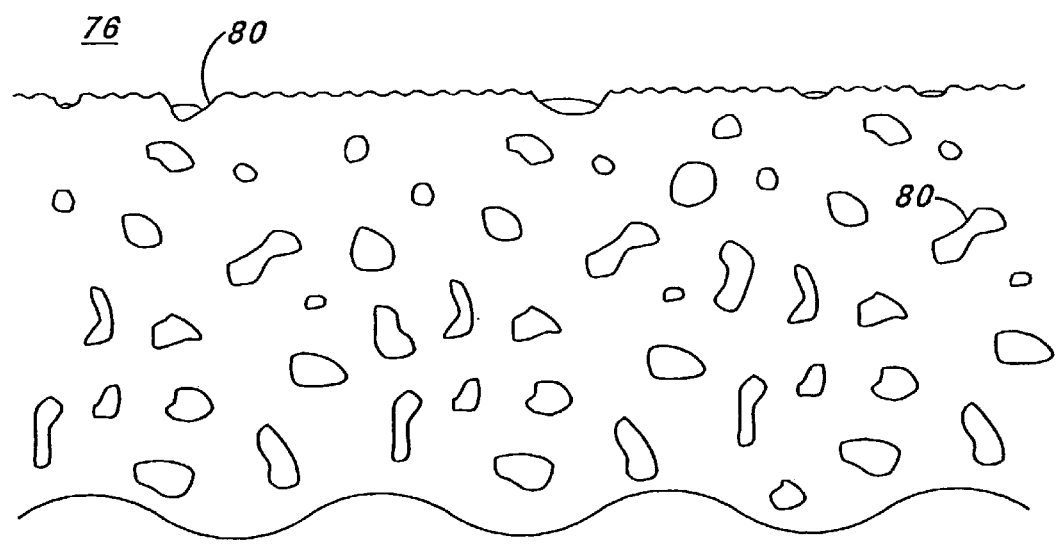
FIG. 4B conceptually illustrates the activated carbon fibers that form part of the carbon cloth used in the electrodes of the double layer capacitor, and additionally helps illustrate how a double layer capacitor is able to achieve such a large surface area, and hence a large capacitance.

By way of example, a suitable carbon cloth that may be used to make the electrodes of the present invention is commercially available from Spectracorp, of Lawrence, Mass., as part number "2225 Carbon Cloth". The diameter of the carbon fibers of such cloth, such as the fiber 78 shown in FIG. 4B, is on the order of 8 microns ($8 \times 10^{-6}$ m); whereas the overall thickness of the carbon cloth is about 0.53 millimeters (mm). The average diameter of the pores in the activated carbon fibers is some 44 angstroms, and the pore/void volume is about 1.2 ml/g. It should be noted that the pore/void volume results from three different types of voids or pores in the cloth: (1) the pores or pits in the individual activated carbon fibers (such as the pores 80 shown in FIG. 4B that cover most of the surface area of the activated carbon fibers), (2) the space between the fibers that form a carbon bundle (which space, for purposes of the present invention, when viewed in a cross section, as in FIG. 9B, is referred to as the "tow" of the fiber bundle); and (3) the voids between the fiber bundles that are woven to form the cloth. Such pore volume results in an overall surface area of the carbon cloth of about 2500 $m^2/g$. Because of the pore/void volume of the cloth, the cloth is somewhat spongy, and therefore compressible. The density of the cloth is typically about 0.3 $g/cm^3$, resulting in an theoretical effective area/unit-volume of about 750 $m^2/cm^3$. With such an area/unit-volume, it is thus possible, see Eq. (1) to achieve capacitances on the order of 6 $F/cm^3$.

Achieving a high capacitance, however, is only part of the invention. If such high capacitance is to be of practical use, it must be able to store and discharge energy in a relatively quick time period. The charge/discharge time of a capacitor, as discussed more fully below, is governed by the internal resistance of the capacitor. The lower the internal resistance, the shorter the charge/discharge time.

Figure 5:
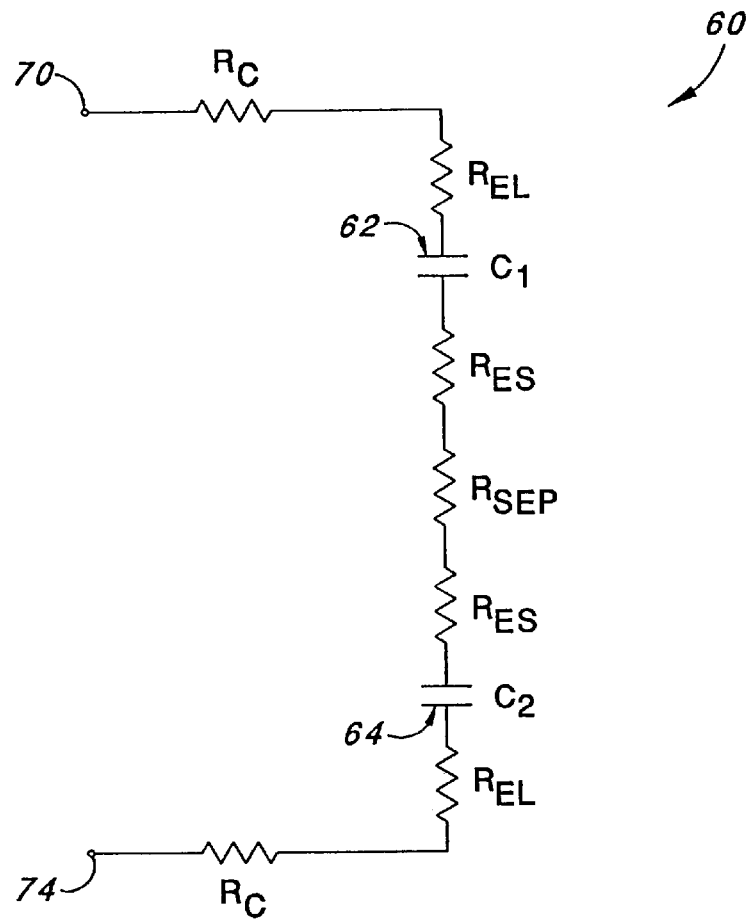
FIG. 5 shows the equivalent circuit diagram of the basic double layer capacitor of FIGS. 4A and 4B.

The internal resistance of the basic double layer capacitor 60 depicted in FIG. 4A is made up of several components, as illustrated in the equivalent circuit diagram of the capacitor 60 shown in FIG. 5. As seen in FIG. 5, the internal resistance of the double layer capacitor 60 includes a contact resistance, $R_C$, which represents all of the resistance in the current path between the capacitor terminal 70 up to the electrode 62 (represented in FIG. 5 as the upper plate of capacitor C1), or all of the resistance in the current path between the capacitor terminal 74 and the electrode 64 (represented in FIG. 5 as the lower plate of capacitor C2).

As further seen in FIG. 5, the internal resistance of the capacitor 60 also includes an electrode resistance, $R_{EL}$, which represents the resistance within the electrode 62 (or within the electrode 64) between the surface of the carbon cloth used to make the electrode and all of the individual activated carbon fibers used within the carbon cloth, i.e., $R_{EL}$, represents the internal contact resistance between the carbon fibers within the electrode. Additionally, an electrolytic solution resistance, $R_{ES}$, exits relative to the electrolytic solution 76; and a separator resistance, $R_{SEP}$ exists relative to the porous separator 66.

Any energy stored within the capacitor 60 must enter or exit the capacitor by way of an electrical current that flows through $R_C$, $R_{EL}$, $R_{ES}$, and $R_{SEP}$. Thus it is seen that in order for practical charge/discharge times to be achieved, the values of $R_C$, $R_E$, $R_{ES}$, and $R_{SEP}$, which in combination with the capacitance C define the time constant $\tau_C$ of the capacitor, must be kept as low as possible.

The resistance of the separator, $R_{SEP}$, is a function of the porosity and thickness of the separator. A preferred separator material is polypropylene having a thickness of about 0.001 inches (0.025 mm). An alternative separator material is polyethylene, also having a thickness of about 0.001 inches (0.025 mm). Polypropylene inherently has larger pores than does polyethylene due the manner in which polypropylene is constructed. Polypropylene typically exhibits a porosity of 25–40%; whereas polyethylene exhibits a porosity of 40–60%. Hence, polyethylene inherently demonstrates a lower separator resistance than does polypropylene simply because it has a higher porosity, i.e, there are more pores or openings through which the electrolyte ions may flow, even though the holes are, on average, smaller.

The resistance of the electrolytic solution is determined by the conductivity of the particular electrolytic solution that is used. In selecting the type of electrolytic solution to use, several tradeoffs must be considered. Aqueous electrolytic solutions generally have a higher conductivity than do non-aqueous solutions (e.g., by a factor of 10). However, aqueous solutions limit the working voltage of the capacitor cell to around 0.5 to 1.0 volt. Because the energy stored in the cell is a function of the square of the voltage, see Eq. (2) above, high energy applications are probably better served using a non-aqueous electrolyte, which permit cell voltages on the order of 2.0 to 3.0 volts. As previously indicated, the preferred electrolyte for use with the double layer capacitor described herein is made from a mixture of acetonitrile ($CH_3CN$) and a suitable salt, which mixture exhibits a conductivity on the order of 50 $ohm^{-1}/cm$. It is to be emphasized, however, that the invention herein described contemplates the use of alternate electrolytic solutions, particularly non-aqueous (or organic) electrolytic solutions, other than the solution made from acetonitrile described above. For example, several alternative electrolytic solutions are disclosed in the previously cited U.S. patent application Ser. No. 08/319,493, filed Oct. 7, 1994 now U.S. Pat. No. 5,621,607.

The contact resistance $R_C$ in combination with the electrode resistance $R_{EL}$, represent a significant source of internal resistance of the capacitor 60. A high electrode resistance has heretofore been a major stumbling block in the development of commercially viable, high energy density, double layer capacitors. A key feature of the present invention is to provide a double layer capacitor having a very low electrode resistance in combination with a high energy density. A major objective of the present invention is to reduce $R_C+R_{EL}$ to a value that is small in comparison to $R_{SEP}$. To that end, much of the discussion that follows focuses on manufacturing and assembly techniques that reduce the electrode resistance, $R_{EL}$, as well as the contact resistance, $R_C$.

Figure 6:
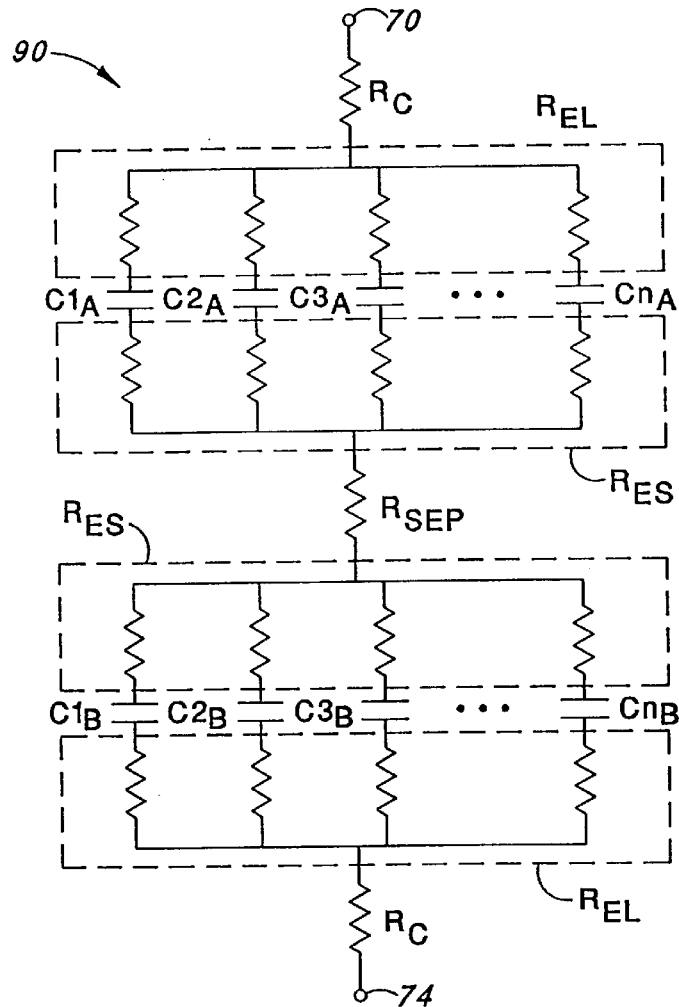
FIG. 6 shows the equivalent circuit diagram of a multi-electrode double layer capacitor made in accordance with a preferred embodiment of the present invention.

To further illustrate the significant role which the electrode resistance $R_{EL}$ plays in the operation of the multi-electrode double layer capacitor of the present invention, reference is next made to FIG. 6. FIG. 6 shows the equivalent circuit diagram of a single cell, parallel-connected multi-electrode double layer capacitor 90 made in accordance with a preferred embodiment of the present invention. The only difference between FIG. 6 and FIG. 5 is that FIG. 5 shows a double layer capacitor (corresponding to that shown in FIG. 4A) that uses just two electrodes 62 and 64. In contrast, the preferred double layer capacitor of the present invention uses a large number of electrodes, e.g., fifty-four electrodes, arranged in an interleaved flat stack within a single cell. Hence, in the equivalent circuit diagram of the capacitor 90 shown in FIG. 6, the multiple electrodes are represented as being connected in parallel in two stacks of n electrodes. A first stack, Stack A, is represented by capacitances $C1_A$, $C2_A$, $C3_A$, ... $Cn_A$. A second stack, Stack B, is similarly represented by capacitances $C1_B$, $C2_B$, $C3_B$, ... $Cn_B$, The effective electrode resistance, $R_{EL}$, is thus a combination of all of the individual resistances that make contact with the multiple electrodes of the n capacitances. Similarly, the electrolytic solution resistance, $R_{ES}$, is represented as a combination of all of the individual resistances that connect with each of the n capacitors. The Stack A capacitors connect with the Stack B capacitors through the parallel combination of all of the electrolytic solution resistances, $R_{ES}$, and a separator resistance, $R_{SEP}$. The total resistance $R_Z$ of the capacitor, based on the model shown in FIG. 6, and further based on a "clamshell" capacitor design as described below in connection with FIG. 12, may be expressed as:

$$R_Z=2R_C+2R_{EL}+2R_{ES}+R_{SEP}\approx 800\ \mu\Omega.$$

Figure 7:
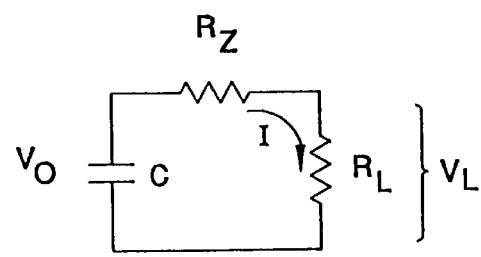
FIG. 7 is a simplified electrical equivalent circuit that illustrates the role the internal resistance of the capacitor, $R_Z$, plays in efficiently delivering energy to a load.

A simplified circuit that illustrates the use of a capacitor as a power source to deliver energy to a load, $R_L$, is shown in FIG. 7. In FIG. 7, all of the capacitor resistances associated with both Stack A and Stack B, including the contact resistance Rc associated with both terminals, and further including the electrolytic solution resistance $R_{ES}$ and the separator resistance $R_{SEP}$ (if not sufficiently low to be neglected), are included in the capacitance resistance $R_Z$.

The total resistance $R_T$ of the power delivery circuit in FIG. 7 is $$R_T=R_Z+R_L. \quad (3)$$

The total time constant T of the power delivery circuit is thus:

$$\tau=R_T C, \quad (4)$$

whereas the time constant $\tau_C$ of just the capacitor is $$\tau_C=R_Z C. \quad (5)$$

The voltage developed across the load $V_L$ is $$V_L=V_O(R_L/R_T)=V_O(1-R_C/R_T) \quad (6)$$

and the power delivered to the load is $$P=IV_L=IV_O(1-R_C/R_T)=IV_O(1-CR_C/CR_T) \quad (7)$$

or $$P=IV_O(1-\tau_C/\tau). \quad (8)$$

The expression $(1-\tau_C/\tau)$ represents the efficiency rating $\epsilon$ of the power delivery circuit, i.e., $$\epsilon=(1-96\ _C/\tau). \quad (9)$$

The degree to which the power source (in this case the capacitor C charged to a voltage $V_O$) is able to efficiently deliver power to the load, $R_L$ is thus highly dependent upon the characteristic RC time constant of the capacitor $\tau_C$. The characteristic RC time constant of the capacitor, in turn, is directly related to the resistance of the capacitor, $R_Z$. For an efficient power delivery circuit to be achieved using the double layer capacitor C, it is thus apparent that the resistance of the capacitor, $R_Z$, must be minimized so that a low time constant of the capacitor $\tau_C$ can be realized.

Advantageously, the present invention provides a multi-electrode double layer capacitor of the type represented in the equivalent circuit of FIG. 6 that, when configured substantially as described below in connection with FIGS. 9A–12, has performance specifications as set forth in Table 1. Such configuration (i.e., the configuration shown in FIG. 12) may be referred to herein as the UC3000. Significantly, a capacitor operating in accordance with the specifications shown in Table 1 exhibits a time constant $\tau_C$ of about 2 seconds. Such a time constant means that at an output voltage $V_O$ of, e.g., 2.3 volts and an output current of 400 A (which means the value of $R_T$ would be about 55–60 milliohms (m$\Omega$)), the capacitor is able to function as an efficient power storage device having an efficiency rating $\epsilon$ greater than about 0.80, and over about 0.9 at an output current of 200 A. Further, the energy

TABLE 1

Performance Specifications of UC3000

| Parameter | Value | Units |
|---|---|---|
| Capacitance | 2,300 | Farad |
| Tolerance | ±10 | % |
| Rated Voltage | 2.3 | Volts |
| Rated Energy | 6,000 | Joules |
| ESR* | 650 | $\mu\Omega$ |
| (*ESR = Electrode Series Resistance) | | |
| Case Style | Two-piece machined Aluminum | |
| Electrical Connection | Each case half is opposite polarity. Electrical connection is through case surface contact | |
| Case Dimensions | 2.28 × 2.62 × 5.80 | inches |
|  | 57.9 × 66.5 × 147 | mm |
| Case Weight | 200 | g |
| Total Weight | 600 | g |
| Internal Volume | 375 | cm$^3$ |
| Electrolyte: | Organic Impregnant (solvent + salt) solvent: acetonitrile (CH$_3$CN) salt: tetraethylamonium tetraflouraborate (CH$_3$CH$_2$)$_4$N$^+$BF$_4^-$ Ratio salt/solvent: 303.8 g/liter | | density achieved is in the range of 2.9–3.5 W-hr/kg, and the power rating is over 1000 W/kg (at 400 A). Such performance in a single cell double layer capacitor, to applicants' knowledge, has never been achieved before.

Figure 14A:
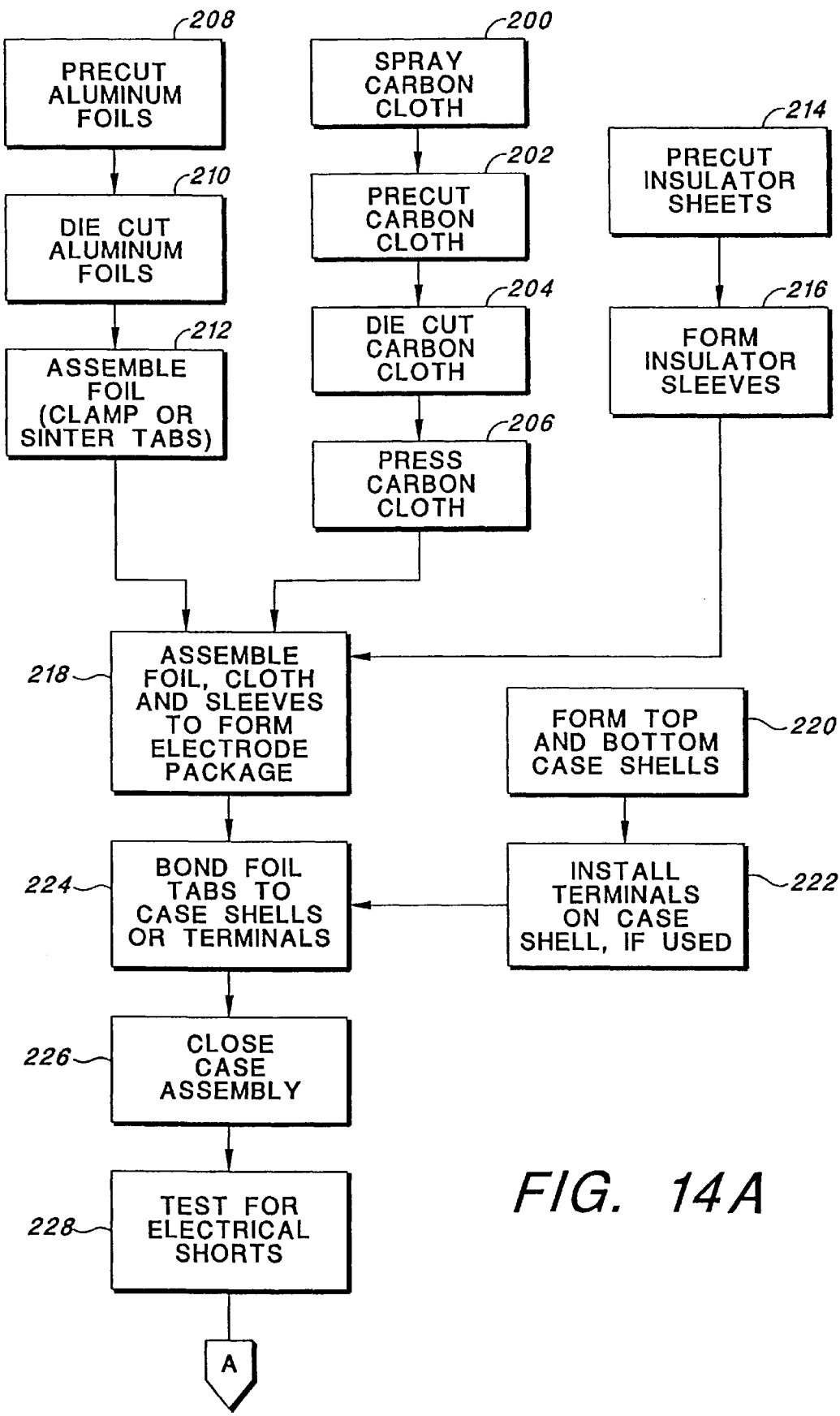
FIGS. 14A and 14B are a flow chart that illustrates the method of making and assembling the preferred "clamshell" double layer capacitor shown in FIG. 10A through FIG. 12.
Figure 14B:
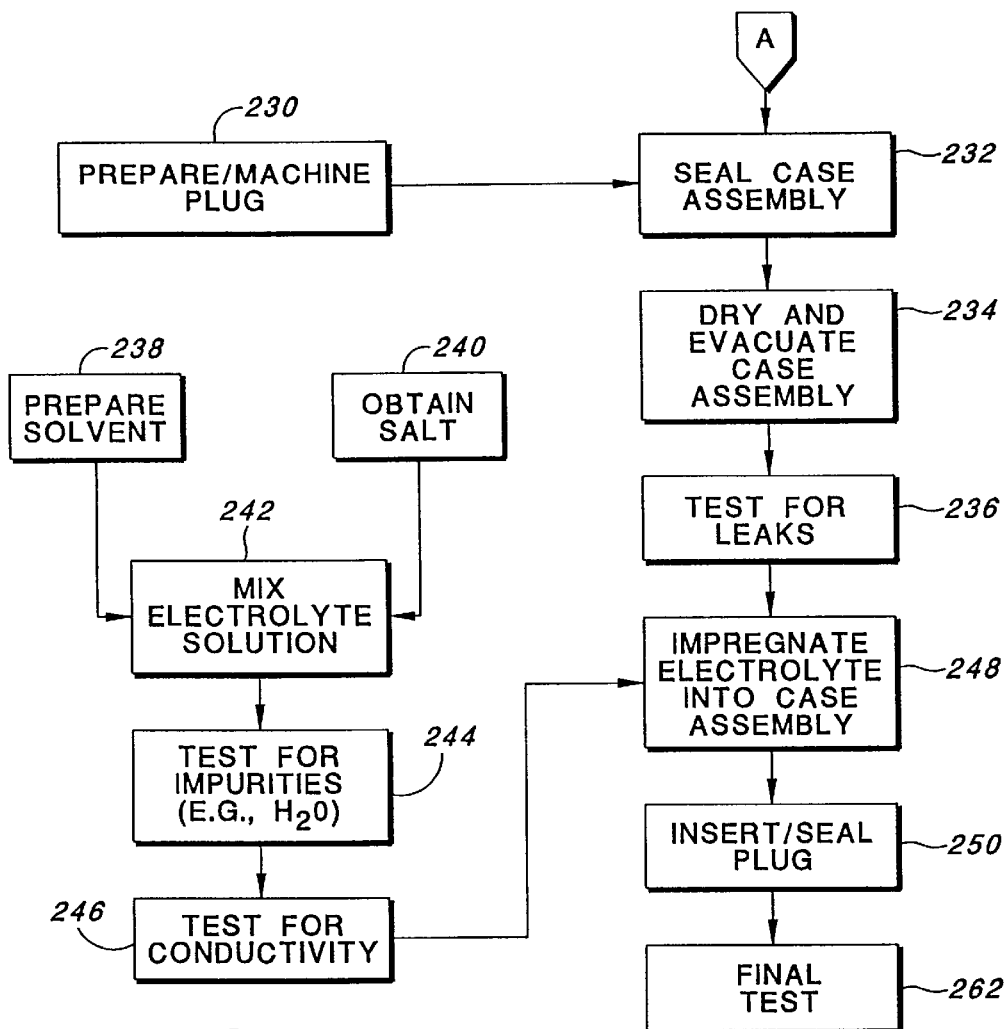

Turning next to FIGS. 8A–14B, the basic technique used in making a double layer capacitor in accordance with the present invention will be described. FIGS. 14A and 14B are a flow chart that illustrates the main steps in such process; while FIGS. 8A–12 illustrate individual steps of the process. Hence, in the description of the assembly and fabrication process that follows, reference will be made to specific blocks or boxes of the flow chart of FIGS. 14A and 14B to identify particular steps, at the same time that reference is made to respective ones of FIGS. 8A–12 to illustrate the step being carried out.

Figure 8A:
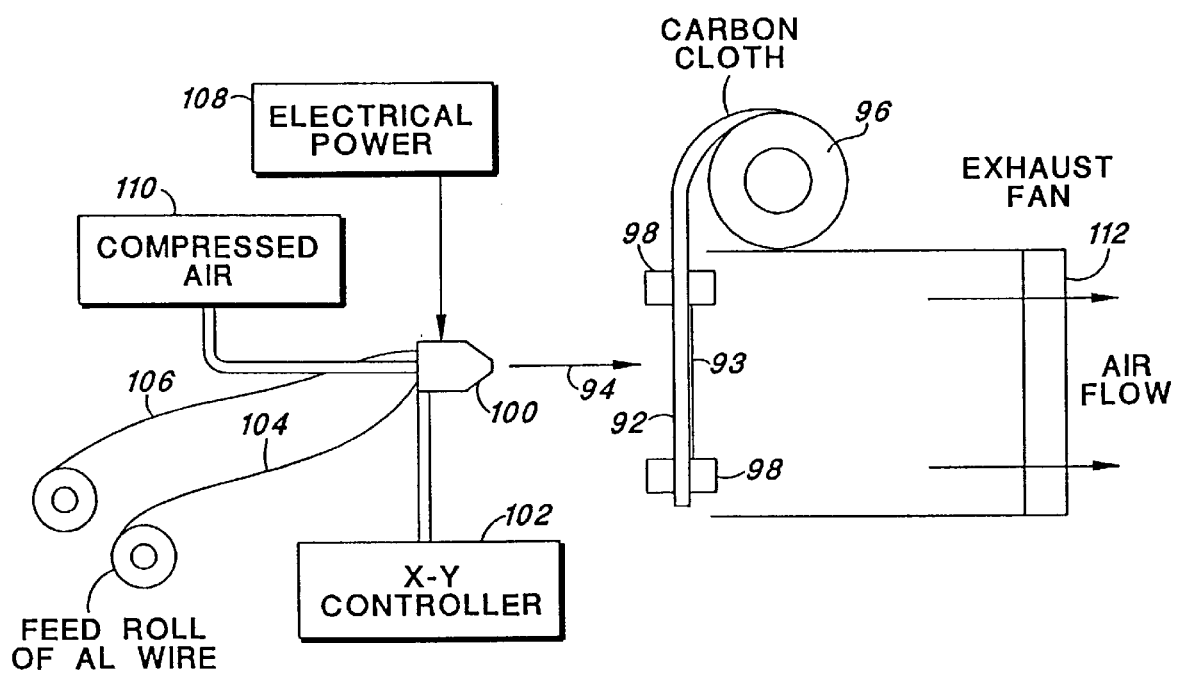
FIGS. 8A and 8B schematically show one technique that may be used to plasma spray an activated carbon cloth with aluminum, thereby impregnating aluminum into the tows of the carbon fiber bundles of the cloth, as illustrated in FIGS. 9A and 9B.
Figure 8B:
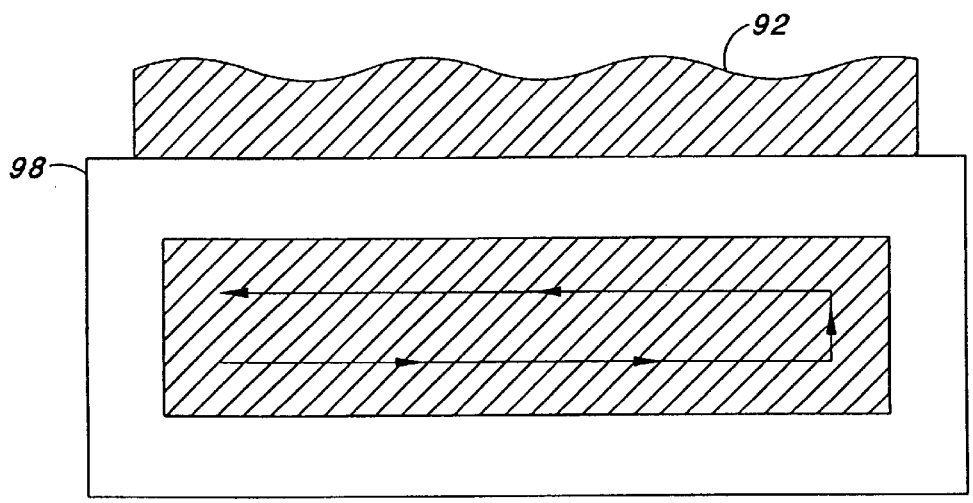

With reference first to block 200 of FIG. 14A, and with reference also to FIGS. 8A and 8B, an initial step to be carried out in making a capacitor 90 (FIG. 6) in accordance with the present invention is to plasma spray a suitable carbon cloth 92 (FIG. 8A) with aluminum plasma spray 94 so that the aluminum is impregnated deep into the tow of the fibers of the carbon cloth. The carbon cloth 92 to be sprayed is preferably a commercially-available cloth, such as part number "2225 Carbon Cloth" obtained from Spectracorp, previously described. Other suitable carbon cloths may, of course, also be used. As seen in FIGS. 8A and 8B, the carbon cloth 92 is typically obtained in a roll 96. The roll is typically about 36 inches wide. A length of carbon cloth 92 is extracted from the roll 96 and held in a suitable frame 98. The frame includes a backup mesh 93. The frame is positioned in front of a plasma spray nozzle 100. The frame 98 exposes a "window" of the cloth having approximate dimensions of 2.31 inches by 34.25 inches, to the plasma spray 94. The plasma spray nozzle is controlled by an X-Y controller 102 to provide a desired spray pattern on the carbon cloth.

The aluminum plasma spray 94 is formed by feeding two aluminum wires 104 and 106 from respective rolls of aluminum wire into the nozzle 100 at a controlled rate. The tips of the wires are held within the nozzle a specified distance apart. A source of electrical power 108 causes an electrical current to flow through the wires and arc across the tips of the wires. The electrical arcing causes the aluminum to melt and vaporize. As the aluminum melts and vaporizes, it is carried out of the nozzle 100 in a plasma stream by compressed air, provided by air compressor 110. As the aluminum is spent and carried away in the plasma stream 94, additional aluminum wire 104, 106 is metered into the nozzle 100 to maintain the desired gap for the electrical arc. In this manner, a source of aluminum is continually metered into the nozzle so that a constant stream of vaporized aluminum can be directed at the carbon cloth.

The vaporized stream of aluminum is sprayed onto and into the carbon cloth 92 following an over-up-and-back spray pattern as shown in FIG. 8B. The backup mesh 93, which has mesh openings on the order of 0.25 in$^2$, allows the plasma flow to continue through the cloth to optimize the volume impregnation with aluminum. The inside dimensions of the frame 98 are roughly 2.3 inches high by 32 inches wide. The aluminum wires 104, 106 are preferably 99.5% pure aluminum having a diameter of about 1/16th of an inch.

In operation, all of the operative equipment shown in FIG. 8A, e.g., the nozzle 100, X-Y controller 102, frame 98, and wires 104, 106 are placed in a plasma spray chamber (to confine the vaporized aluminum). The air in the chamber is dried. An exhaust fan 112 maintains a constant flow of air through the chamber in the direction away from the nozzle 100. The cloth 92 is manually clamped in the frame 98, and a single spray pattern is performed. Only one side of the cloth is sprayed. Once sprayed, the cloth is released from the frame. A new length of unsprayed carbon cloth 92 is then be indexed in the frame, as needed, for the next strip of carbon cloth to be sprayed.

The operating parameters used during the plasma spray process are as follows: The electrical current used to vaporize the aluminum is 60–65 amperes at an arc voltage of about 26 V. The compressed air is maintained at a pressure of approximately 50 psi. The distance between the tip of the nozzle 100 and the cloth is 20 inches. The complete spray pattern is traversed at a constant rate in a time period of about 45 seconds. The nozzle is adjusted so that the stream of vaporized aluminum covers the cloth as uniformly as possible with minimum overlap. Once the aluminum spraying process has been completed, a layer of aluminum is present on the front side of the cloth, and there should be a slight visual pattern of the backup mesh 93 visible on the back side of the cloth. Such pattern provides visual verification that at least some aluminum has penetrated all the way through the cloth to optimize volume impregnation during the spraying process.

All of the equipment referenced in FIG. 8A is conventional. The details and manner of operating such equipment are known to those of skill in the art.

The purpose of spraying the carbon cloth with the aluminum is to reduce the transverse resistance through the cloth 92. Measured data of the electrode series resistance (ESR), taken before and after plasma spraying and with various amounts of aluminum is summarized in Table 2.

TABLE 2

| Aluminum Density (mg/cm³) | Capacitance (F/g) | ESR of Capacitor (Ω-cm²) |
|---|---|---|
| 0 (unsprayed) | 115 | 52.0 |
| 157 | >130 | 1.509 |
| 209 | >140 | 1.299 |
| 250 | 147 | 1.26 |
| 410 | 144 | 1.08 |
| 509 | >130 | 1.308 |

The data in TABLE 2 was taken using electrodes that were 2500 m²/g cut to 5.1 cm in diameter and that contained approximately 0.2 g of carbon. The carbon density in the unsprayed cloth was 0.26 g/cm³.

As seen from the data in TABLE 2, the resistance of a carbon cloth that has been plasma sprayed with aluminum reduces the resistance of the cloth by up to a factor of 50. Such a dramatic reduction in resistance, which is caused by a decrease in the volumetric resistivity of the electrode structure, directly influences the electrode resistance, $R_{EL}$, and thus significantly improves the ability of the capacitor to exhibit a low time constant.

As further seen from the data in TABLE 2, reducing the resistance of the electrode through impregnation of aluminum is a process that must be optimized in order to produce the lowest resistance for a desired amount of aluminum. Too little aluminum and the resistance remains too high. Too much aluminum, and the weight of the electrode is increased sufficiently to degrade the energy density. Too much aluminum also blocks the electrolyte from penetrating into the carbon weave so as to contact all of the surface area of the fibers, thereby effectively decreasing the available surface area.

It is significant that the aluminum spray 94 which is directed at the carbon cloth 92 (FIG. 8A) does much more than just coat the surface of the carbon cloth with aluminum. While the aluminum certainly does coat the surface, it also penetrates into the cloth, and thus impregnates the cloth with aluminum. The significance of impregnating the cloth with aluminum is best illustrated with reference to FIGS. 9A and 9B.

Figure 9A:
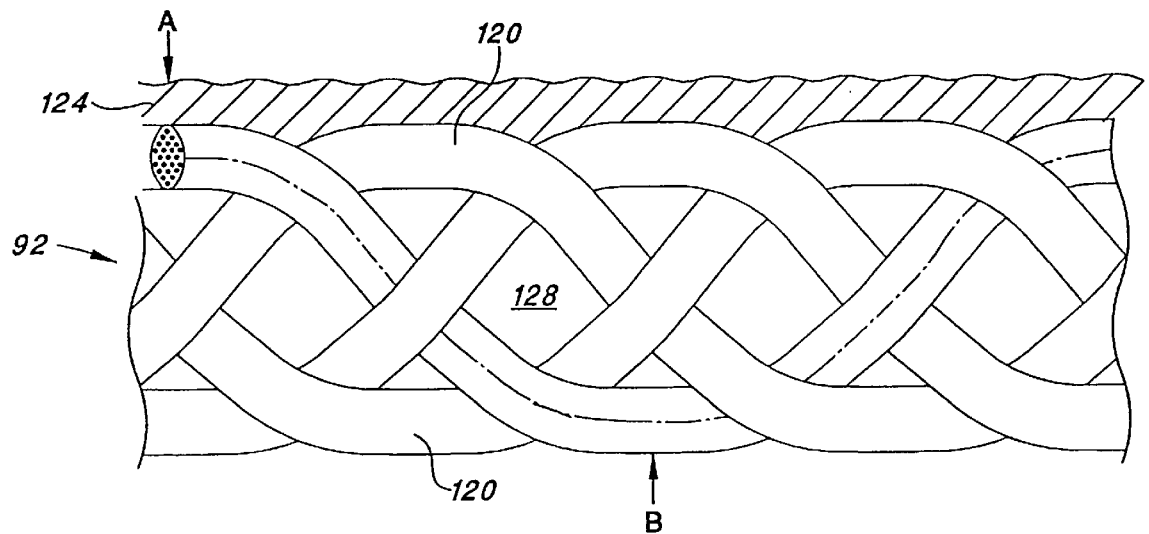
FIG. 9A shows a schematic representation of a side sectional view of the carbon cloth, and illustrates how a plurality of fiber bundles are woven to form the carbon cloth.
Figure 9B:
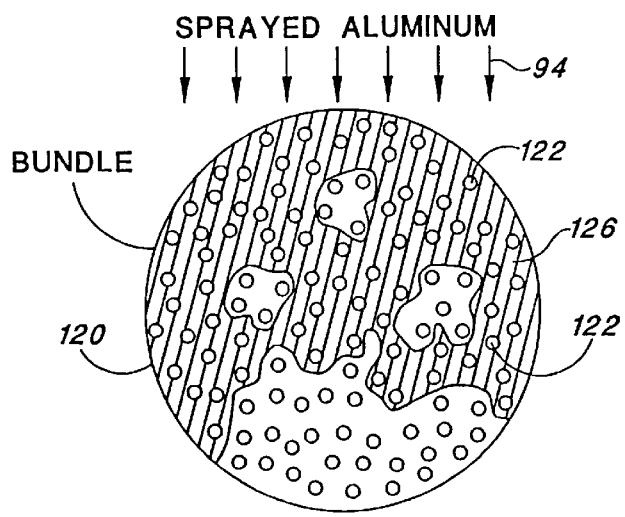
FIG. 9B conceptually illustrates a cross-sectional view of an individual fiber bundle of the carbon cloth, and further conceptually illustrates a preferred penetration of the aluminum deep into the tow of the fiber bundle.

FIG. 9A shows a schematic representation of a side sectional view of the carbon cloth 92. As seen in FIG. 9A, the carbon cloth 92 is made up of a plurality of fiber bundles 120 that are woven to form the carbon cloth. For simplicity, only four such fiber bundles 120 are shown in FIG. 9A. Each fiber bundle 120 is made up of many carbon fibers 122, as seen best in FIG. 9B, which conceptually illustrates a cross-sectional view of an individual fiber bundle 120.

The axial resistance of the individual carbon fibers 122 is very low, but the transverse resistance through a carbon bundle 120 is relatively high. It is this transverse resistance, i.e., the resistance from point "A" on one side of the cloth 92 to point "B" on the other side of the cloth, which must be lowered in order to reduce the electrode resistance $R_{EL}$. Plasma spraying the carbon cloth 92 with an aluminum spray 94 advantageously causes the aluminum to flow into the tow 126 of the bundle 120, as shown in FIG. 9B. Such penetration, or impregnation, into the tow of the fiber bundle 120 thereby reduces the contact resistance between the individual fibers 122. The resulting low transverse contact resistance together with the intrinsic low axial resistance of the fibers then permits a very low resistance path to be made completely through the width of the cloth 92, i.e., provides a very low transverse resistance through the electrode structure.

When the aluminum spray 94 strikes the cloth 92, it not only impregnates the tow 126 of the fiber bundle 120 with aluminum, as described above, but it also forms a layer 124 of aluminum on the sprayed surface of the cloth. In addition, some of the aluminum also fills some of the voids 128 between the fiber bundles. The aluminum layer 124 helps to make good (low resistance) electrical contact with the foil current collectors 68 and 72 (FIG. 4A). That is, the aluminum layer 124 serves to lower the contact resistance, $R_C$. The presence of aluminum in the voids 128 between the fiber bundles adds weight to the electrode and should thus be minimized after achieving adequate volumetric resistivity and a low characteristic RC time constant.

The ideal impregnation depth of the aluminum into the tow 126 of the carbon fiber bundles 120 has not yet been quantified. It is believed, however, that the impregnation pattern, when viewed in cross-section, is similar to that illustrated in FIG. 9B, filling about ⅔ to ¾ of the available tow volume at the point where the bundle is exposed at the surface of the cloth.

The weight of aluminum retained on or in the carbon cloth is maintained at between about 42–53%, e.g., 48%, of the total weight of the carbon cloth plus aluminum, or about 15% of the total weight, including the electrolyte.

Returning to FIG. 14A, it is seen that after-the carbon cloth has been sprayed and impregnated with aluminum (block 200), the impregnated carbon cloth is precut into strips having dimensions greater than 2 by 10 inches (block 202). The precut impregnated carbon cloth strips and then die cut (block 204) to more exact dimensions of 2×10 inches, and the corners of the stip are rounded to have a radius of approximately 0.03 inches. The die cut impregnated carbon cloth strips are then pressed in a mechanical press so as to be subjected to a pressure of about 1600 psi. The carbon cloth 92 is somewhat spongy, so application of this pressure serves to compress somewhat the weave of the fiber bundles 120 so as to make the cloth thinner by about 15–20%. This reduction in the thickness of the cloth translates directly to a reduction in the thickness of the electrode structure, when assembled, and to a reduction in the resistance of the electrode structure. Further, and more importantly, application of the pressure to the impregnated carbon cloth strips smooths the sprayed side of the cloth (smooths out the valleys and peaks) so that more surface area of the sprayed aluminum layer 124 is able to contact the current collector foils 132, explained below in connection with FIGS. 10A–10D, so as to reduce the contact resistance $R_C$ of the assembled capacitor.

Figure 10A:
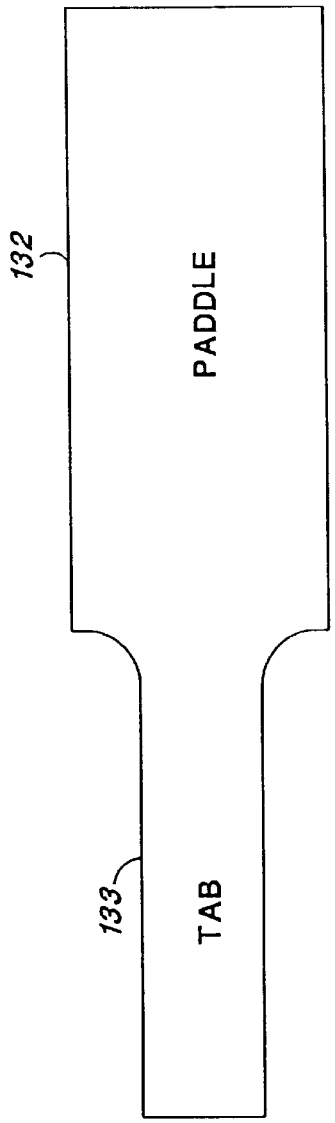
FIGS. 10A–10F illustrate a preferred method for making a stack of electrodes for use in a multi-electrode double layer capacitor.

Still with reference to FIG. 14A, in a parallel path to preparing the impregnated carbon cloth strips, the foil current collectors are also prepared. A first step in preparing the foil current collectors is to precut aluminum foil to an approximate desired dimension (block 208), and then die cut the aluminum foil to the precise dimension (block 210). The preferred aluminum foil used for the current collector has a thickness of approximately 0.002 inches. The foil is cut to a shape substantially as shown in FIG. 10A. Such shape includes a paddle end 132 and a tab end 133. The tab end 133 and the paddle end 132 thus comprise a current collector foil 130 (sometimes referred to as the current collector plate). The current collector foil 130 is about ten inches long. The paddle end 132 is about 6 inches long, and the tab end 133 is about 4 inches long. The paddle end 132 has a width of about 2 inches, and the tab end has a width of about 1 inch.

Figure 10B:
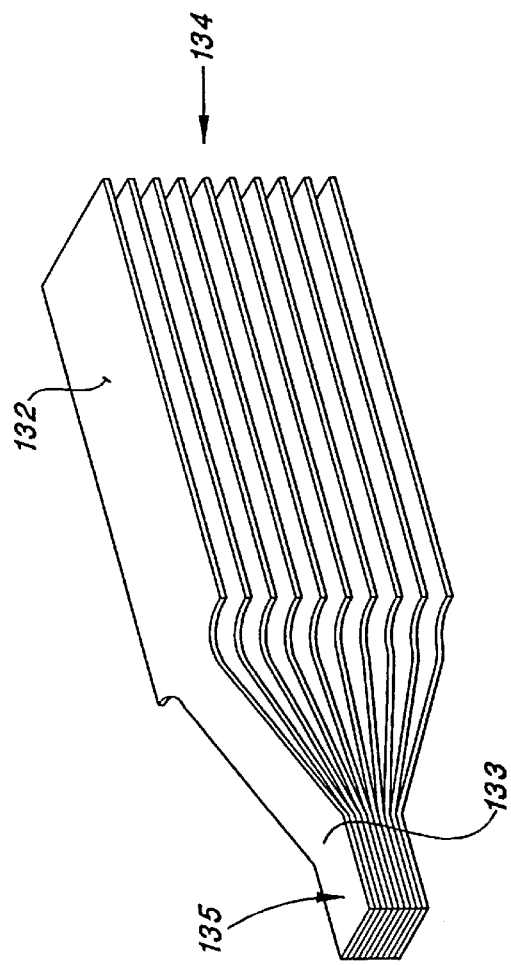
Figure 10C:
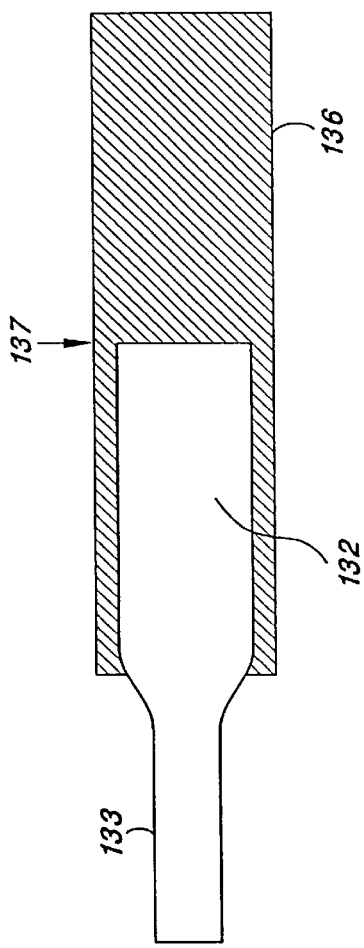
Figure 10D:
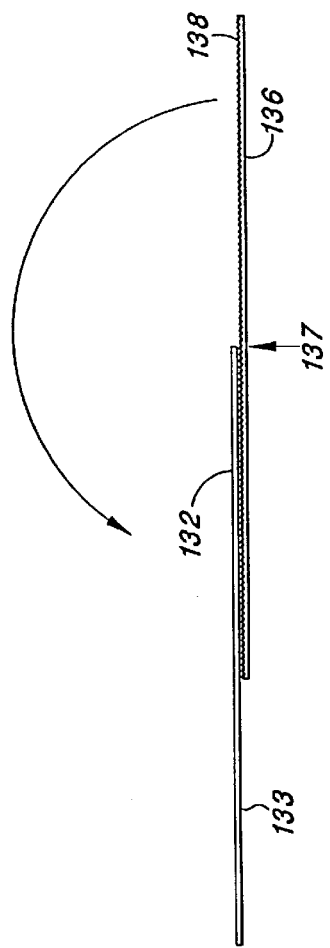
Figure 10E:
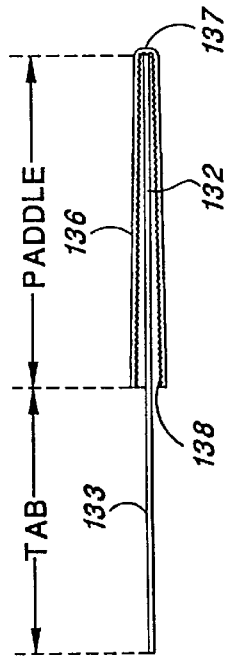

Two stacks of 27 current collector foils are next assembled (block 212, FIG. 14A) in the manner illustrated in FIG. 10B. In each stack 134, the tab ends 133 of the twenty-seven collector foils 130 are bonded together, using any suitable bonding technique, such as sintering or ultrasonic welding, thereby forming a solid tab end 135 where each collector foil is thus electrically and mechanically connected in a secure manner to each of the other collector foils in the stack 134. In contrast, the paddle ends 132 of the collector foils 130 in the stack remain disconnected from the other paddle ends.

Figure 10F:
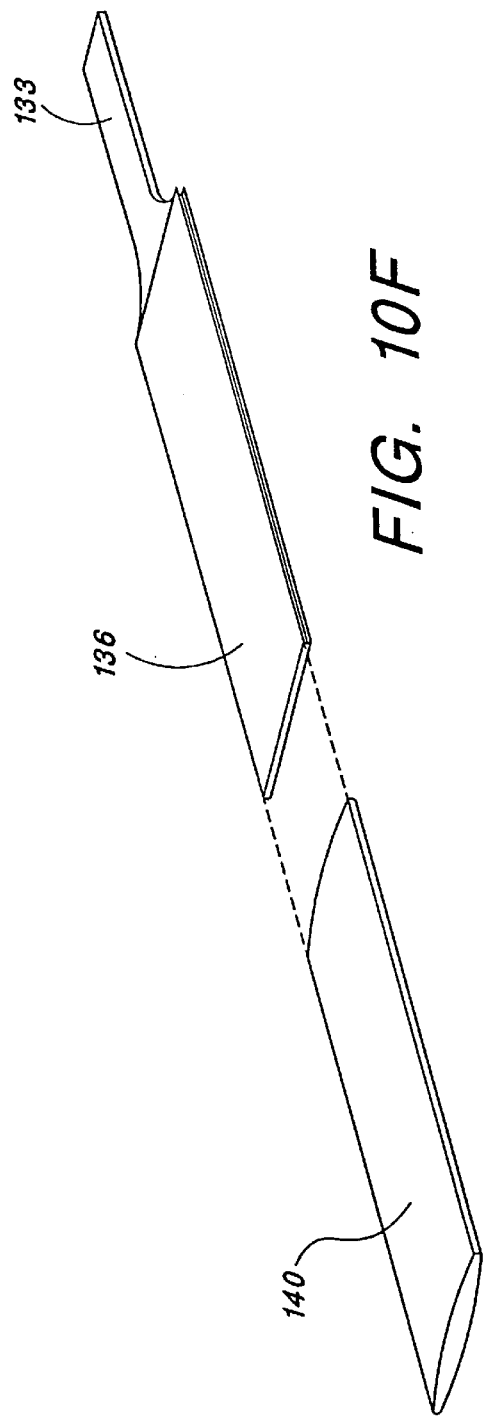

Referring back to FIG. 14A for the moment, it is seen that in addition to preparing the impregnated carbon cloths (blocks 200–206), and preparing the aluminum current collector foils 130 (blocks 208–212), insulator sleeves 140 (FIG. 10F) must also be prepared. Such insulator sleeves 140 function as the separator 66 (FIG. 4) in the double layer capacitor. The sleeves are made by precutting a suitable insulator/separator material (block 214), such as polypropylene or polyethylene, into strips. A suitable material for use as the separator is Celguard 2400, commercially available from Hoechst Celanese of Charlotte, N.C. Celguard is a polypropylene-based material that is approximately 0.001 inches thick, and has an average pore size of about 0.04× 0.12 µm. The Celguard (or other separator material) is formed into sleeves or tubes (block 216, FIG. 14A) having a size that allows the sleeves to loosely slide over a current collector foil 130 which has an impregnated carbon cloth strip 136 folded around it, as shown in FIG. 10F. The edges of the Celguard may be securely bonded to each other in order to form the sleeve through use of any suitable sealing technique, such as thermal bonding, as is known in the art.

Once the current collector foils 130, the aluminum-impregnated carbon cloth strips 136, and the separator sleeves 140 have been formed or otherwise fabricated, an electrode package may be assembled (block 218, FIG. 14A). Such electrode package assembly involves wrapping or surrounding each of the foil paddles 132 of each electrode stack with the impregnated carbon cloth strips 136 in the manner illustrated in FIGS. 10C, 10D and 10E. As seen in these figures, the cloth strips 136 are folded at a central fold line 137, with the sprayed side of the cloth being placed against both sides of the paddle end 132 of the collector foils 130. Each collector foil in each of the two collector foil stacks has a folded cloth strip 136 placed over it in this manner, except for the topmost collector foil in one stack, and the bottommost collector foil in the other stack, which foils have a half of a cloth strip 136 positioned on the side of the collector foil that faces inward in the stack. The separator sleeves 140 are then placed over the combination of the carbon cloth strip 136 and the paddle end 132 of each of the collector foils 130 of one of the two collector foil stacks, e.g., Stack "B". The "leaves" of the two foil stacks (where a "leaf" comprises the collector foil and its accompanying carbon cloth strip), one having an separator/insulator sleeve 140 inserted over each leaf, and the other having no separator/insulator sleeve, are then interleaved with each other as depicted in FIG. 11A to form an interleaved electrode assembly 141.

The completed electrode assembly 141 includes a flat stack of electrodes, e.g., 54 electrodes. Each electrode is made up of a current collector foil 130 that is surrounded by an aluminum-impregnated carbon cloth strip 136. Each carbon cloth strip is separated and electrically insulated from an adjacent carbon cloth stip by the separator material 140. Alternating electrodes are electrically connected in parallel by the bonded tabs 135 (Stack A) or 142 (Stack B) of the respective current collector foils.

Figure 11A:
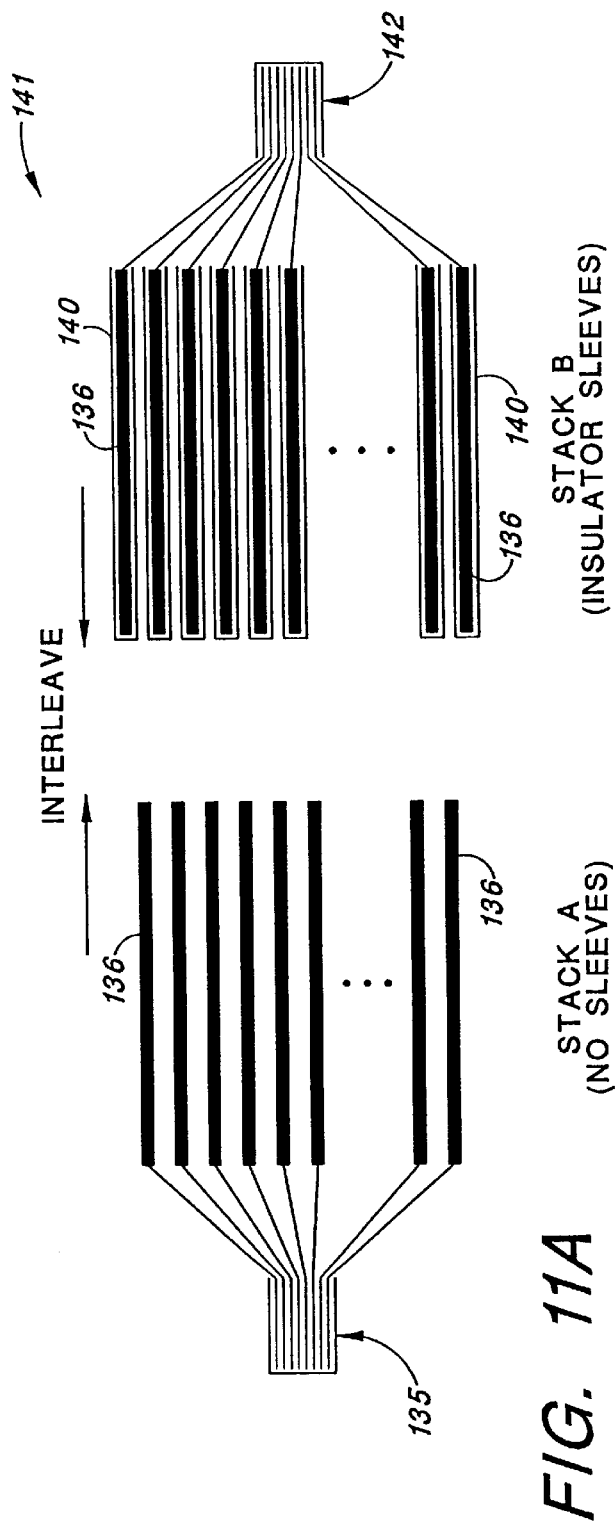
FIG. 11A illustrates how the individual electrodes of two electrode stacks, made as illustrated in FIGS. 10A–10F, one stack of which has a porous separator placed over each electrode ad shown in FIG. 10F, are interleaved to form an electrode assembly.
Figure 11B:
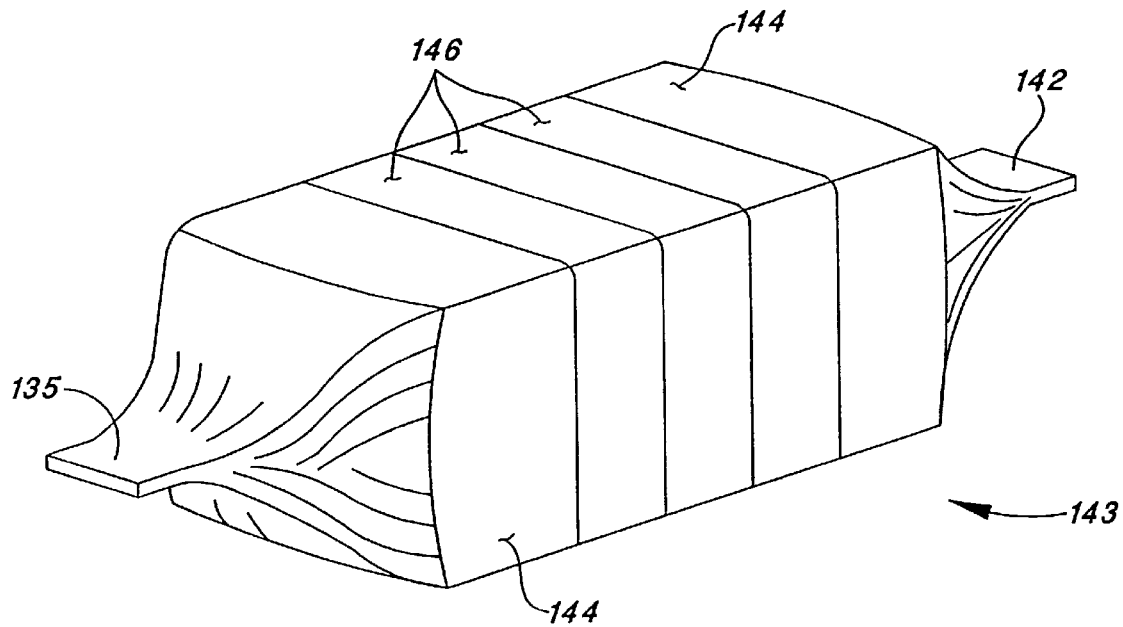
FIG. 11B depicts the electrode assembly of FIG. 11A after it is wrapped with a suitable separator material to form an electrode package.
Figure 11C:
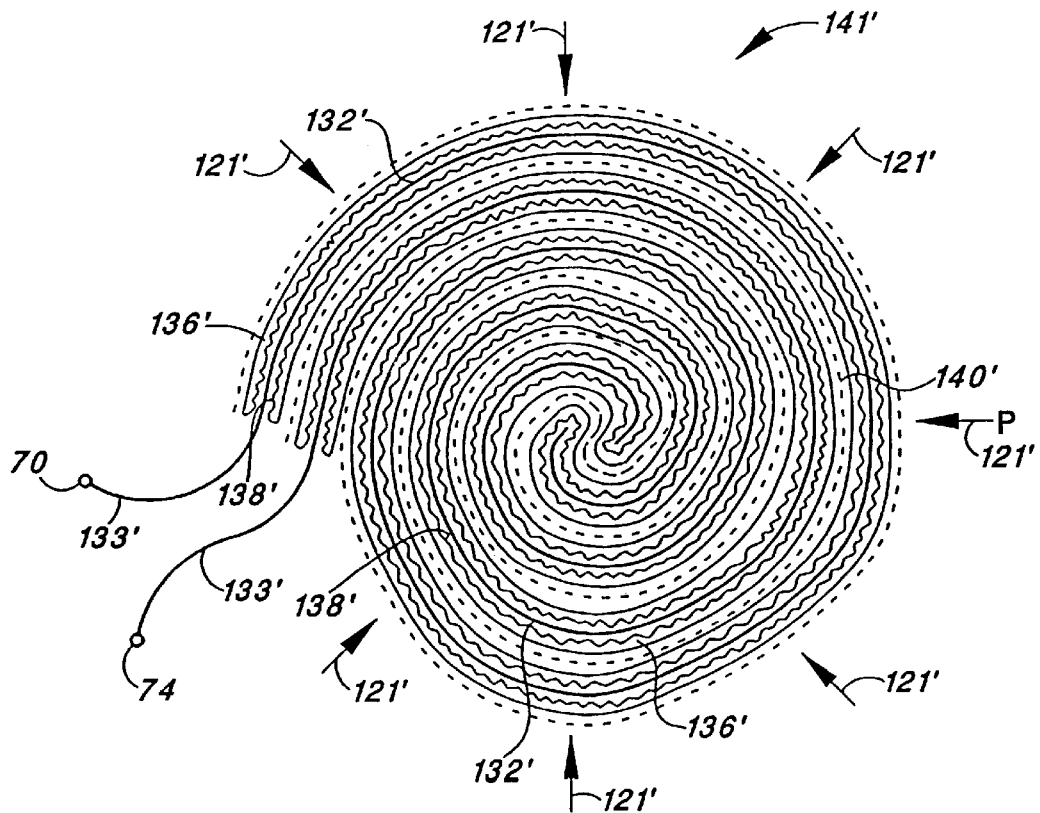
FIG. 11C depicts an alternate spiral wound configuration of the electrode assembly.

An alternate electrode assembly 141' that may be used in a spiral-wound embodiment of the invention is depicted in FIG. 11C. In FIG. 11C, two elongate current collector foils 136', each having a tab portion 133' that is connected to the appropriate capacitor terminals 70 and 74, and each having a corresponding elongate aluminum-impregnated carbon cloth 136' folded over it so that a sprayed side 138' of the cloth faces the foil 132', are spirally wound together. An insulator or separator sleeve 140' is placed over one of the foil/cloth electrodes of the wound assembly to prevent the electrodes from electrically shorting each other as they are wound together.

The length and width of the current collector foils 132' and the corresponding aluminum-impregnated carbon cloth electrodes 136' of the spiral-wound electrode assembly 141' embodiment shown in FIG. 11C may be chosen so that approximately the same electrode area is achieved as is achieved using the interleaved flat stack assembly 141 shown in FIG. 11A, or to achieve a desired performance criteria. An advantage of the spiral-wound assembly 141' is that it is somewhat easier to assemble and manufacture than the interleaved flat stack assembly 141. An advantage of the interleaved flat stack assembly 141, however, is that the resistance of the current collector foils may be lower (because it uses many parallel short current collectors as opposed to one long current collector). Additionally, the interleaved flat stack assembly 141 lends itself to more efficient use in a rectangular-shaped case, whereas the spiral-wound assembly 141' is best suited for use in cylindrical-shaped case. Depending on the application for which the capacitor is to be used, a rectangular-shaped case may prove more beneficial than a cylindrical-shaped case.

Returning to a description of the assembly of the interleaved flat stack assembly 141 (FIG. 11A), after the two electrode stacks have been interleaved to form the assembly 141, the entire assembly is wrapped in a suitable insulating material 144, such as Celguard (FIG. 11B). The insulating material 144 may be held in place with a suitable tape 146 which is also tightly wrapped around the assembly 141, thereby forming a wrapped flat stack electrode package 143. The current collector tabs 135 and 142 extend from each end of the package 143.

Figure 12:
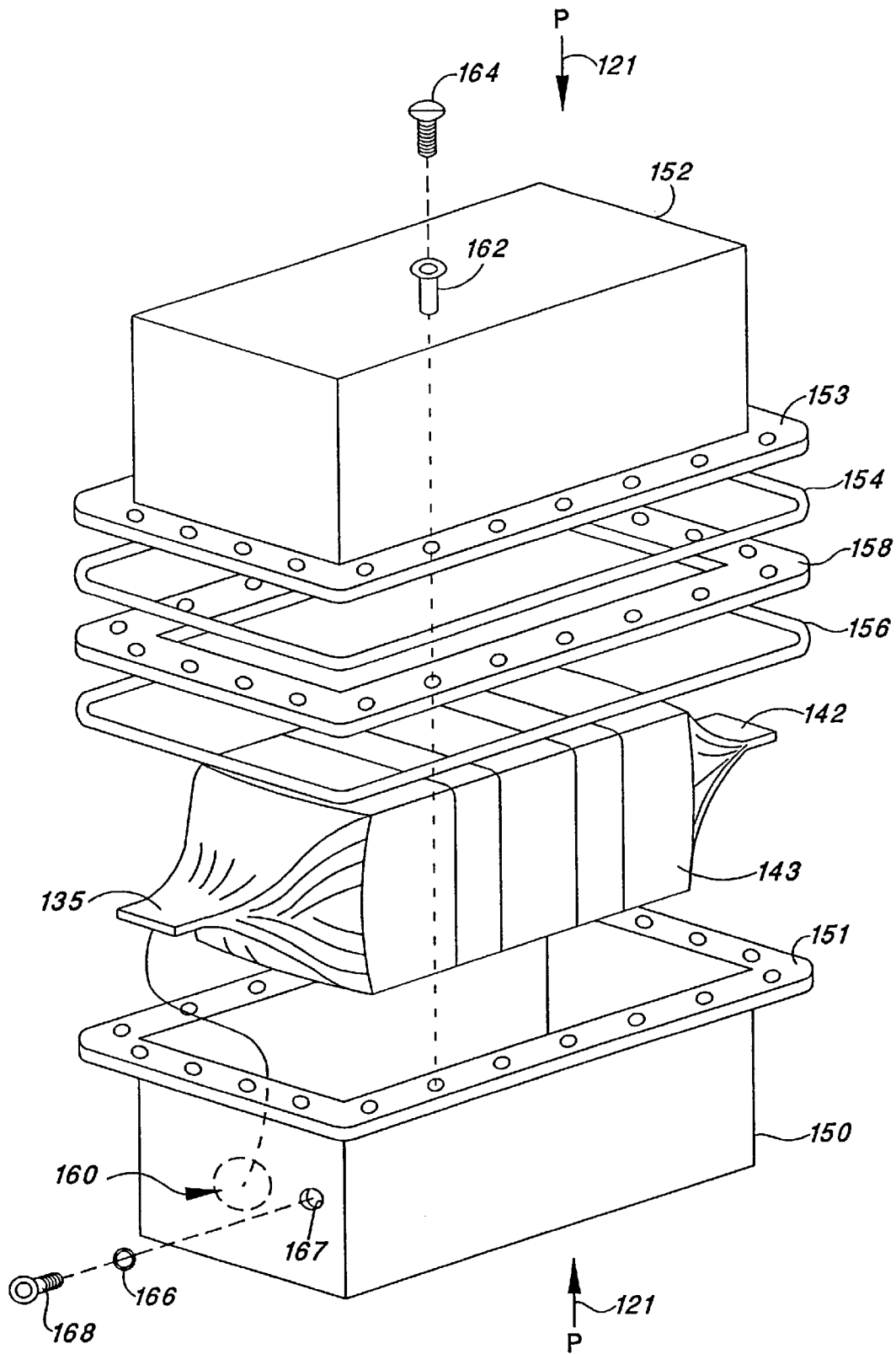
FIG. 12 is an exploded view of a preferred "clamshell" double layer capacitor, illustrating how the electrode package of FIG. 11B is positioned inside of upper and lower conductive shells, which shells are tightly sealed one to the other to complete the capacitor assembly.

Once the flat stack electrode package 144 has been fabricated, the final mechanical assembly of the capacitor may be completed. Such mechanical assembly is illustrated in FIG. 12, which figure shows an exploded view of the physical components of the preferred double layer capacitor. Such components include a lower conductive shell 150 and an upper conductive shell 152. One of the tabs, e.g., tab 135, of the electrode package 143 is bonded to the inside of the lower shell 150 at location 160. The other tab, e.g, tab 142, of the electrode package 143 is bonded to the inside of the upper shell 152 at a corresponding location. Such bonding (block 224, FIG. 14A) may be achieved using any suitable bonding technique, such as spot welding, ultrasonic welding, or the like. The bond must, of course, be a low resistance bond, having a resistance of no more than about 5 µΩ, if the overall low electrode resistance $R_{EL}$, of the capacitor is to be maintained.

Once the tabs of the electrode package 143 have been bonded to the respective upper and lower conductive shells, the capacitor case assembly is closed (block 226, FIG. 14A) by attaching and sealing the upper shell 152 to the lower shell 150 using any suitable attachment/sealing technique. Note that the upper and lower shells, in combination, comprise the case of the capacitor assembly. A preferred technique for closing the case of the capacitor, shown in FIG. 12, uses screws 164, in combination with insulating nylon bushings 162, to securely fasten a flange 153 of the upper shell 152 to a corresponding flange 151 of the lower shell 150. To assure a good seal when the flanges of the upper and lower shells are joined together, an O-ring 154 fits within a groove around the periphery of the flange 153, and another O-ring 156 fits within a similar groove around the periphery of the flange 151. Further, a polypropylene gasket 158 electrically insulates the two shells from each other.

Because, like clamshells, the case of the capacitor is closed by fastening the upper shell 152 fastened to the lower shell 150, the packaging configuration depicted in FIGS. 10A–12 is sometimes referred to by the applicants as the "clamshell" assembly or the "clamshell" design.

An important feature of the "clam-shell" assembly shown in FIG. 12 is that the electrode package 143, in its wrapped and interleaved form, has somewhat larger dimensions than the inside dimensions of the upper and lower shells. However, because the carbon cloth is somewhat spongy, it is compressed sufficient to fit within the closed upper and lower shells. Hence, the package 143 remains slightly compressed as it placed inside of, and maintained within, the upper and lower shells. This results in the electrode package 143 being maintained under a constant modest pressure of about 10 psi when the upper shell 152 and the lower shell 150 are mechanically joined together. This continual modest pressure further serves to lower the contact and electrode resistance of the electrode assembly because it keeps the current collector foils 130 in firm mechanical contact with the sprayed side of the respective impregnated carbon cloth strips 136. The presence of such constant modest pressure is represented in the drawings by the arrows 121 which symbolically represent that the electrode assembly 141 is maintained under a constant modest pressure, "P" applied in a direction so as to force or press the electrodes in contact with the current collector foils (see FIG. 11B). For the spiral-wound assembly 141', shown in FIG. 11C, the constant modest pressure "P" is applied in a radial direction, as illustrated by the arrows 121'. While the modest pressure is about 10 psi, in practice the pressure may vary anywhere from about 5 psi to 18 psi. The structural design of the upper and lower shells (or other capacitor case), while not comprising a pressure vessel per se, is nonetheless designed to withstand an internal pressure of up to about 20 psi.

An important component needed to complete the capacitor assembly is a means for filling the closed assembly with a suitable electrolytic solution, and then permanently sealing the assembly. To this end a seal plug 168, which is threadably received into a fill hole 167 located at one end of the lower shell 150, is provided, as seen in FIG. 12. An O-ring gasket 166 is used with the plug 168 is order to effectuate the seal. A similar fill hole (not shown) is located at the other end of the upper shell 152. Using two fill holes facilitates moving gases and fluids into and out of the closed assembly.

Referring again to FIG. 14A, once the case assembly has been closed (block 226), it is tested for electrical shorts. This test is performed simply by measuring the resistance between FIG. 12, these two shells, each of which is conductive, function as the electrical terminals of the capacitor. In an ideal capacitor, this resistance (for a "dry" assembly—no electrolyte yet introduced into the closed case) should be infinite. A low resistance measurement, e.g., of just a few ohms, between the upper and lower shells of the closed dry assembly, indicates that an electrical short has occurred internal to the assembly. In practice, a dry resistance of at least 20 MΩ is acceptable to pass this test for electrical shorts.

Still with reference to FIG. 14A, it is noted that a step previously performed before bonding the foil tabs to the case shells (block 224) comprises forming or otherwise fabricating the bottom shell 150 and the top shell 152 (block 220). In the presently used embodiment, the shells are each machined from a solid block of aluminum. The outside dimensions of the closed assembly, including the flanges 151 and 153 are 2.25 inches high by 2.62 inches wide and 5.60 inches long. The body of the case (not including the flanges) has a width of about 2.18 inches, which means the flanges 151 and 153 extend out from the body of the case about 0.22 inches. As indicated above in Table 1, the internal volume of the capacitor case is about 375 cm$^3$, and the case weight is about 200 g.

As previously indicated, for the clamshell configuration shown in FIG. 12, the upper and lower shells function as the two terminals of the capacitor. It is contemplated that shells made using relatively inexpensive stamped and/or pressed copper-clad aluminum, as opposed to more-expensive machined aluminum blocks, may be used in the future. Copper-clad aluminum is preferred for this purpose, as opposed to aluminum, because it will provide a lower external contact resistance when several of the capacitors are stacked together. Using stamped and/or pressed materials to form the shells of the capacitor assembly advantageously reduces the weight of the case to about 100 g, and increases the energy density from about 2.9 W-hr/kg to about 3.5 W-hr/kg.

It should also be noted that alternative packaging schemes are also contemplated for the invention. For example, a double-ended capacitor design, shown in FIGS. 13A, 13B and 13C, may be used. The double-ended configuration shown in FIGS. 13A. 13B and 13C includes an elongated capacitor case 170 having a generally square cross-section, that has a terminal 172 at each end of the package. The terminal 172 preferably includes a threaded hole 173 to which a threaded screw or bolt may be attached. The material of the case 170 may be conductive or non-conductive. If conductive, the terminals are electrically insulated from the case by the gaskets 176 and 178. The terminal 172 is attached to each end of the double-ended assembly using a nut 174. A washer and/or gasket 176 may be used with the nut 174 to firmly secure the terminal in place and provide electrical insulation from the case when needed. An insulating gasket 178 is used on the inside of the case to seal the terminal 172 and prevent leaks. During assembly of the double-ended design, the tabs 135 and 142 of the flat stack internal electrode package 143 (FIG. 11B) are bonded to the inside of the terminals at each end of the case 170.

Note that a seal plug 166 and gasket 168 are made available at at least one end of the double ended capacitor, as shown in FIG. 13B. Preferably, a seal plug is made available in both ends of the capacitor to facilitate filling the assembly with the electrolytic solution.

The main advantage of the double-ended configuration shown in FIGS. 13A, 13B, and 13C is that the shell material need not be a conductor (although it can be), but may be a suitable light-weight non-conductive material, such as plastic. The overall weight of the case of the double-ended capacitor shown in FIGS. 13A, 13B and 13C may thus be made significantly less than the weight of the capacitor case for the capacitor configuration shown in FIG. 12. The weight of the case is important because it contributes directly to the energy density of the capacitor.

Because some alternative packaging schemes may include terminals, as illustrated above in connection with FIGS. 13A, 13B and 13C, the flow diagram of FIG. 14A includes the step of installing the terminals on the case, if such terminals are used (block 222).

Turning next to FIG. 14B, once the capacitor has been assembled as shown in FIG. 12 (or FIGS. 13A, 13B or 13C), and tested for electrical shorts (block 228, FIG. 14A), the case assembly is sealed (block 232), as required, or made sealable, using the seal plug 168 and gasket 166. The sealable case is then evacuated and the internal components are thoroughly dried (block 234). Such drying process typically takes place over a 2 or 3 day period, and comprises attaching a vacuum pump to the closed assembly, via the fill hole 167 (FIG. 12), and maintaining a constant negative pressure of about $10^{-6}$ Torr for a specified period of time, e.g., 48 to 72 hours. Once dried, the assembly is tested for leaks (block 236). Such leak testing may be done using any suitable technique as is known in the art. A preferred leak test includes spraying an inert gas, e.g., helium (He), over and around the closed case while it is still connected to the vacuum pump, and while a negative pressure is still maintained within it. If there is a leak, the negative pressure inside the case sucks the He gas through the leak, and the He gas can then be detected in the outstream flow of the vacuum pump.

If the leakage test is successfully passed, then the case is ready to be impregnated, through the fill hole, with a prescribed amount of a specified electrolytic solution (block 248).

The electrolytic solution is mixed by dissolving a selected salt in a prescribed solvent. Hence, to prepare the solution, the solvent is prepared (block 238) and the specified salt (block 240) is procured. As previously indicated, the preferred solvent is an organic solvent acetonitrile ($CH_3CN$). The preferred salt is tetraethylamonium tetraflouraborate, or $(CH_3CH_2)_4N^+BF_4^-$. The electrolytic solution is mixed (block 242) by first drying the salt for at least 12 hours, and then dissolving the dried salt in the solvent. The ratio of salt to solvent is 303.8 g/liter, which yields 1.4 moles/liter.

Figure 16A:
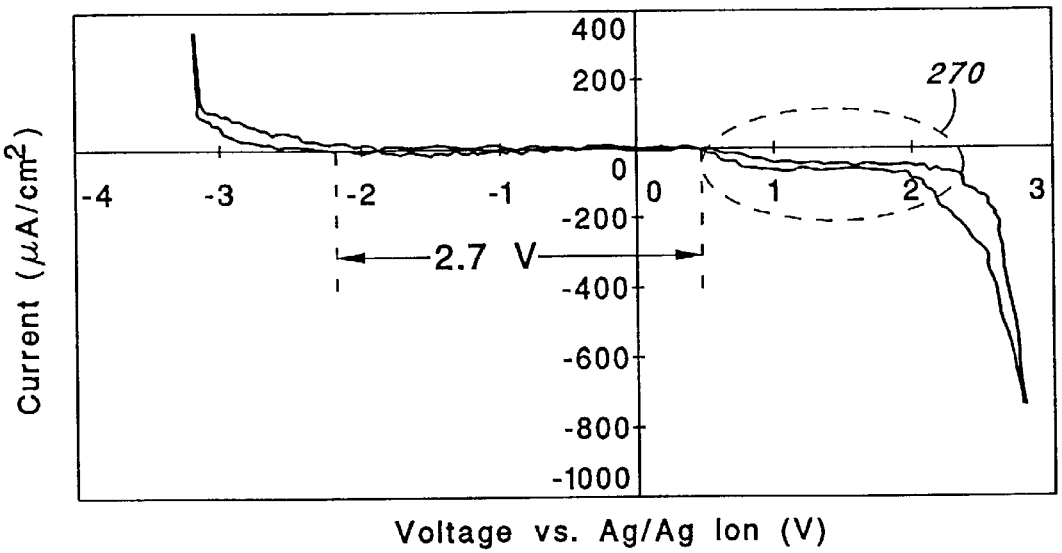
FIGS. 16A and 16B show current-voltage graphs of the double layer capacitor made in accordance with the present invention, and further illustrate the working voltage obtainable with such design for two different levels of impurities (water) in the electrolytic solution.
Figure 16B:
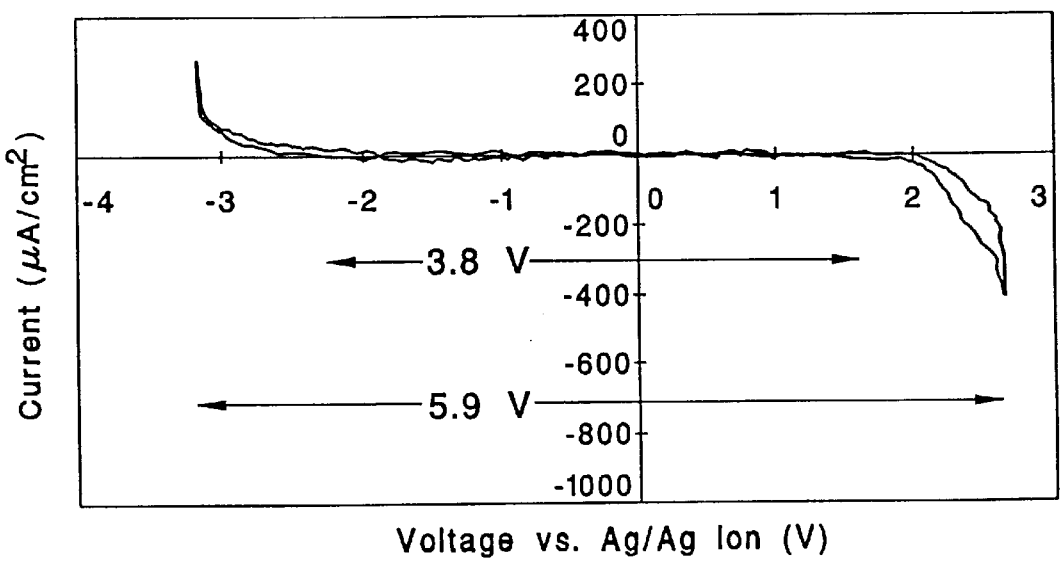

Once mixed, the electrolyte is tested for impurities (block 244). It is important that the amount of water in the electrolyte be reduced to less than 20 ppm (parts per million), preferably less than about 15 ppm. If the level of impurities, e.g., water, in the electrolyte exceeds 20 ppm, the operating voltage of the capacitor may be adversely affected. For example, when the amount of water in the electrolyte reaches a level of 40 ppm, the useful operating voltage of the capacitor is reduced to about 70% of what it is when the water in the electrolyte is only 14 ppm, as shown in FIGS. 16A and 16B. It is thus seen that it is important for impurities, particularly water, to be removed from the electrolyte before the electrolyte is impregnated into the closed case assembly. (It is noted that some additives may be added to the electrolyte, e.g., to enhance its performance or improve the operating life of the capacitor; but water must be avoided.)

The water content of the solution is measured using a coulometric titrator, as is known in the art. A representative titrator that may be used for this purpose is the LC3000 Titrator available from EM Science Aquastar.

Unfortunately, some water may already be inside of the closed case assembly, despite attempts to thoroughly dry the inside of the assembly. For example, water may be trapped in the carbon fibers of the carbon cloth. Such trapped water may be released into the electrolyte, thereby becoming an impurity within the electrolyte, as soon as the impurity-free electrolyte is impregnated into the case assembly. To remove such water (or similar impurities) from the carbon, it is contemplated that the closed assembly be flushed with a suitable solvent, e.g., acetonitrile, the electrolytic solution, or other water-scavenger material, prior to filling the assembly with the electrolyte. Having a fill hole at each end of the closed assembly makes flushing the inside of the closed assembly possible. It is also contemplated that the carbon cloth, prior to being impregnated with aluminum, and/or after being impregnated with aluminum, but before being assembled in the electrode stacks, may also be flushed or cleansed with a suitable material (e.g., water scavengers or additives that search out and remove water) selected to remove impurities, especially water.

If the electrolytic solution successfully passes the impurity test (block 244), it is also tested for conductivity (block 246). The conductivity test is performed using a conventional conductance meter that measures conductance using an ac signal. The conductance of the solution should be at least 55–58 mmho/cm at 22° C.

Once the electrolytic solution has been mixed and tested for impurities and conductivity, it is impregnated into the closed case assembly (block 248; FIG. 14B). Impregnation is preferably done by positioning the electrode case so that one fill hole is on the bottom and another on the top, and then filling the case with the electrolyte under pressure from the bottom to the top so that any gases present in the case are not trapped therein. The amount of electrolytic solution that should be impregnated into the closed case, for the clamshell case design shown in FIG. 12, is 200 ml (or 205 g).

After the prescribed amount of electrolytic solution has been impregnated into the closed case, the plugs 168 are inserted into the fill holes 167 to finally seal the case (block 250; FIG. 14B). Then, final electrical tests of the capacitor are performed (block 262) to test whether the capacitor meets its specified performance criteria.

The final acceptance tests performed are detailed in Appendix A, attached hereto and incorporated herein by reference. (In this regard, it is noted that the flat stack clamshell capacitor design described herein, and shown in FIG. 12, is referred to in Appendix A as the "UC3000".) Generally, the acceptance tests include charging the capacitor to is specified working voltage, $V_W$, for six hours and then allowing the capacitor to self-discharge over a fourteen hour period. The voltage drop that occurs during this 14 hour self-discharge period provides a measure of the equivalent parallel resistance of the capacitor, which should be at least 200 ohms, preferably over 350–400$\Omega$, e.g., at least 360$\Omega$. (A self-discharge resistance of 200$\Omega$ corresponds to a self-discharge time constant of at least 5.8 days.)

Figure 15:
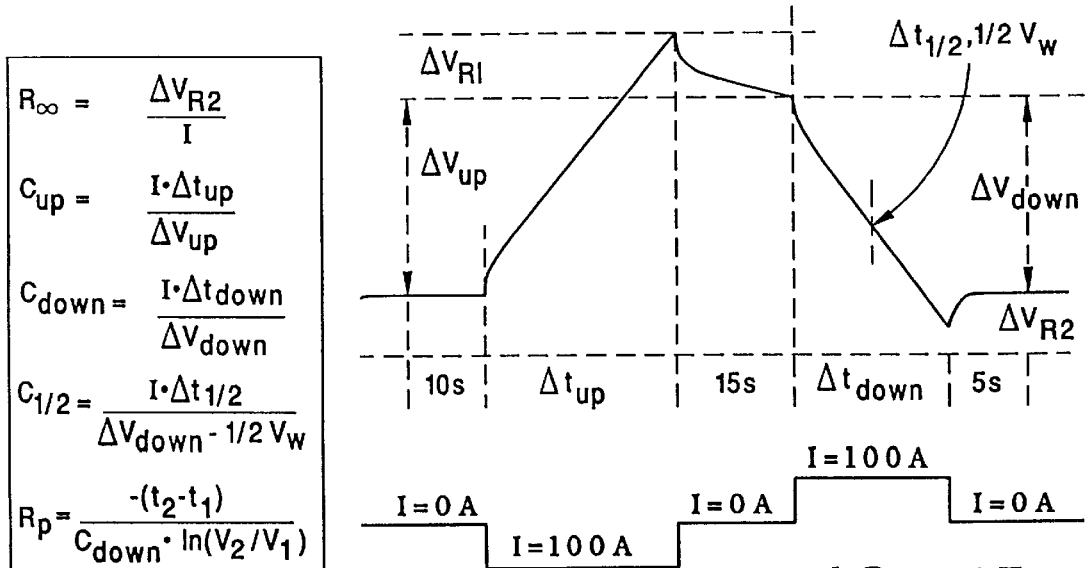
FIG. 15 depicts current and voltage waveforms associated with testing a double layer capacitor made in accordance with FIGS. 14A and 14B.

Additional acceptance tests that are performed include subjecting the capacitor to a constant current cycle test to determine the cycling capacitance and steady state series resistance. This test is performed by applying a biphasic 100 amp and/or 200 amp current to the capacitor as shown in FIG. 15. The voltage waveform resulting from application of the current is measured. From the current and voltage waveforms, which includes time measurements, a large number of parameters are determined to characterize the capacitor. Such parameters include the charge capacitance, $C_{up}$; the discharge capacitance, $C_{down}$; the half discharge capacitance, $C_{1/2}$, and the steady state resistance, $R_\infty$. In order to meet presently-imposed desired performance criteria, these values should be $C_{down} > 2200$ Farad, $C_{1/2} \geq C_{down}$ by about 150 Farad; $R_\infty < 1$ milliohm, $C_{up}/C_{down} > 0.98$; and $C_{down}/C_{up} < 1.05$.

For the first group of single cell, multi-electrode double layer capacitors that have been made in accordance with the present invention, i.e., using the clamshell design shown in FIG. 12, the acceptance test data is as shown in Table 3.

TABLE 3

| Parameter | Value | Std. Deviation |
|---|---|---|
| $C_{down}$ | 2422 f | 44.6 f |
| $R_\infty$ | 0.908 mΩ | 0.058 mΩ |
| $C_{up}/C_{down}$ | 1.01 | |
| $R_{parallel}$ | 387 Ω | 53 Ω |

The final acceptance tests also include ac impedance tests. The extremely low impedance of the double layer capacitor makes the ac impedance measurements difficult using standard equipment and techniques. The key parameter to measure is the initial resistance, $R_0$. This resistance affects the peak power the capacitor can deliver. It is measured at 1000 Hz using a Solatron 1250 Frequency Response Analyzer and a PARC 273 Poteniostat. $R_0$ should be about one-half of the value of $R_\infty$, or about 0.45 mΩ.

As described above, it is thus seen that the single cell, multi-electrode double layer capacitor provided by the present invention represents a significant advance in the double-layer capacitor art. The use of carbon cloth impregnated with aluminum, folded around a current collector foil plate, forms an efficient electrode structure that provides very low electrode resistance. By connecting a large number, e.g., twenty-seven, of such electrodes in parallel in a first electrode stack, and interleaving the electrodes of the first electrode stack with a second electrode stack wherein each electrode is further surrounded by a suitable separator/insulator electrode sleeve, and then by packaging such interleaved electrode package within a sealed case that maintains the electrode package under a modest pressure, and then by further impregnating the sealed case with a prescribed amount of highly-conductive non-aqueous electrolyte, a double layer capacitor is realized that exhibits capacitance values in excess of 2200 Farad at a nominal working voltage of about 2.3 volts, an electrode resistance of about 0.8 mΩ, a time constant of about 2 seconds, an energy density in the range of 2.9–3.5 W-hr/kg, and a power rating of over 1000 W/kg at a 400 Amp discharge. Advantageously, these operating parameters can improve even more when the capacitor is operated at a higher voltage, e.g., 2.7 volts, or even 3.0 volts (which can be readily be done once all the impurities are removed from the electrolytic solution) and the weight of the case is reduced. For example, at an operating voltage of 3.0 volts, the energy density rises to 5.9 W-hr/kg. Further, by using a polyethylene separator material, instead of a polypropylene separator, the effective electrode resistance may be reduced even further, allowing the time constant of the capacitor to be reduced to around 1.5 seconds.

While the invention described above has been described by means of specific embodiments and applications thereof, numerous modifications and variations could be made thereto by those of skill in the art without departing from the scope of the invention set forth in the claims.

What is claimed is:

1. A method of making a double layer capacitor comprising:

impregnating metal into carbon fiber bundles of each of a plurality of carbon cloths forming a plurality of impregnated carbon cloths;

forming a plurality of current collector foils, each of the plurality of current collector foils having a tab portion and a paddle portion;

bonding the tab portion of each of one half of the plurality of current collector foils to each other and to a first capacitor terminal, thereby forming a first plurality of bonded current collector foils;

bonding the tab portion of each of another half of the plurality of current collector foils to each other and to a second capacitor terminal, thereby forming a second plurality of bonded current collector foils;

forming, respectively, a first plurality of electrodes and a second plurality of electrodes by positioning one of the plurality of impregnated carbon cloths against respective paddle portions of each of the first plurality of bonded current collector foils and respective paddle portions of each of the second plurality of bonded current collector foils, wherein each of the first and second plurality of electrodes comprises one of the plurality of bonded current collector foils and the one of the plurality of impregnated carbon cloths;

interleaving the first plurality of electrodes and the second plurality of electrodes with respective porous separator portions positioned between each of the first and second plurality of electrodes, wherein the porous separator portions function as electrical insulators between adjacent ones of the first and second plurality of electrodes preventing electrical shorting against each other, thereby forming an interleaved electrode stack;

applying a constant pressure against the interleaved electrode stack;

saturating the interleaved electrode stack with an electrolytic solution; and maintaining the interleaved electrode stack immersed within the electrolytic solution.

2. The method of claim 1 wherein said impregnating said metal further comprises impregnating with said metal into said carbon fiber bundles by spraying molten metal deep into a tow of said carbon fiber bundle, thereby reducing carbon to carbon contacts for decreasing a transverse resistance of the carbon fiber bundle.

3. The method of claim 1 further comprising controlling porosity of each of said plurality of carbon cloths during said impregnating step.

4. The method of claim 3 wherein said controlling porosity of each of said plurality of carbon cloths further includes adjusting a standoff distance between a spray unit and said each of said plurality of carbon cloths.

5. The method of claim 3 wherein said controlling porosity of each of said plurality of carbon cloths further includes controlling a sweep rate of a spray unit relative to said each of said plurality of carbon cloths.

6. The method of claim 3 wherein said controlling porosity of each of said plurality of carbon cloths further includes controlling a delivery temperature and pressure of said metal to said each of said plurality of carbon cloths.

7. The method of claim 3 wherein said controlling porosity of each of said plurality of carbon cloths further includes adjusting an electrical current to a spray unit.

8. The method of claim 3 wherein said controlling porosity of each of said plurality of carbon cloths further includes adjusting an air flow of an exhaust fan in a direction away from a spray unit.

9. The method of claim 1 wherein said impregnating step includes impregnating into said carbon fiber bundles of each each of said plurality of carbon cloths with said metal, said metal being selected from a group consisting of aluminum and titanium.

10. The method of claim 1 further comprising pressing each of said plurality of impregnated carbon cloths with a mechanical press prior to said forming of said first plurality of electrodes and said second plurality of electrodes.

11. The method of claim 1 further comprising wrapping said interleaved electrode stack with said porous separator material, prior to said applying of said modest constant pressure, forming a wrapped interleaved electrode stack.

12. The method of claim 11 wherein said applying said constant pressure includes:

placing said wrapped interleaved electrode stack between an upper conductive shell and a lower conductive shell; and attaching the upper conductive shell and the lower conductive shell together, an interior dimension formed being smaller than a dimension of said wrapped interleaved electrode stack, thereby forcing said wrapped interleaved electrode stack to conform with the interior dimension.

13. The method of claim 12 further comprising placing a gasket in between said upper conductive shell and said lower conductive shell prior to said attaching step, forming a clamshell assembly.

14. The method of claim 13 further comprising:

coupling electrically said first capacitor terminal to an interior of one of said lower conductive shell and said upper conductive shell; and coupling electrically said second capacitor terminal to an interior of another of said lower conductive shell and said upper conductive shell.

15. The method of claim 14 wherein said saturating step comprises:

saturating said wrapped interleaved electrode stack located inside said clamshell assembly with said electrolytic solution, by directing said electrolytic solution into said clamshell assembly through a fill hole in said clamshell assembly; and sealing the fill hole with a seal plug received through another gasket into the fill hole.

16. The method of claim 11 wherein said applying said modest constant pressure includes:

placing said wrapped interleaved electrode stack within a double-ended elongated container, having internal dimensions slightly smaller than a dimension of said wrapped interleaved electrode stack thereby applying a modest constant pressure against said wrapped interleaved electrode stack; and attaching a terminal to each end of the double-ended elongated container, one or both of the terminals having a fill hole.

17. The method of claim 16 further comprising:

coupling electrically said first capacitor terminal to said terminal at one end of said double-ended elongated container; and coupling electrically said second capacitor terminal to said terminal at another end of said double-ended elongated container.

18. The method of claim 17 wherein said saturating comprises saturating said wrapped interleaved electrode stack located inside said double-ended elongated container with said electrolytic solution, by directing said electrolytic solution into said double-ended elongated container through said fill hole; and sealing said fill hole with a seal plug received through a gasket into said fill hole.

19. The method of claim 18 wherein said placing said wrapped interleaved electrode stack within said double-ended elongated container comprises placing said wrapped interleaved electrode stack within a non-conductive double-ended elongated container.

20. The method of claim 17 further comprising placing an insulating gasket in between said terminal at one end of said double-ended elongated container and said double-ended elongated container, for insulating said terminal at one end of said double-ended elongated container from said double-ended elongated container, said double-ended elongated container being conductive.

21. The method of claim 1 wherein said impregnating comprises impregnating said metal into said carbon fiber bundles of each of said plurality carbon cloths forming said plurality of impregnated carbon cloths having surface areas greater than 500 $m^2/g$.

22. The method of claim 1 wherein said interleaving comprises interleaving said first plurality of electrodes and said second plurality of electrodes with one of a porous polypropylene material and a porous polyethylene material positioned between each of said first plurality of electrodes and said second plurality of electrodes.

23. The method of claim 1 wherein said saturating comprises saturating said interleaved electrode stack with said electrolytic solution comprising a prescribed solvent into which a specified amount of a prescribed salt has been dissolved to form ions.

24. The method of claim 23 wherein said saturating step includes saturating said interleaved electrode stack with said electrolytic solution comprising acetonitrile; and said specified amount of tetraethylammonium tetraflouraborate.

25. The method of claim 1 wherein said impregnating further comprises impregnating said metal into said carbon fiber bundles of each of said plurality of carbon cloths comprising activated carbon fibers, formed in carbon-fiber bundles, with spaces or voids between individual carbon fibers within a carbon-fiber bundle being referred to as a "tow" of the carbon-fiber bundle, and with the carbon-fiber bundles being woven to form a carbon cloth, by spraying said metal, while in a fluid form or a vaporized form, into the tow of the carbon-fiber bundles.

26. The method of claim 1 wherein said forming, respectively, said first plurality of electrodes and said second plurality of electrodes includes said forming, respectively, said first plurality of electrodes and said second plurality of electrodes by positioning said one of said plurality of impregnated carbon cloths against said respective paddle portions of said each of said first plurality of bonded current collector foils and said respective paddle portions of said each of said second plurality of bonded current collector foils, wherein said each of said first and second plurality of electrodes comprises said one of said plurality of bonded current collector foils and said one of said plurality of impregnated carbon cloths, wherein an impregnated side of said one of said plurality of said impregnated carbon cloths contacts said one of said plurality of bonded current collector foils.

27. The method of claim 1 wherein said interleaving comprises said interleaving said first plurality of electrodes and said second plurality of electrodes with respective porous separator sleeves positioned between said each of said first and second plurality of electrodes, wherein the porous separator sleeves function as said electrical insulators between said adjacent ones of said first and second plurality of electrodes preventing electrical shorting against each other, thereby forming said interleaved electrode stack.

* * * * *

UNITED STATES PATENT AND TRADEMARK OFFICE
CERTIFICATE OF CORRECTION

PATENT NO. : 6,094,788
DATED : August 1, 2000
INVENTOR(S) : Farahmandi, et al.

It is certified that error appears in the above-identified patent and that said Letters Patent is hereby corrected as shown below:

IN THE CLAIMS:

Column 26,
Line 34, delete "with".
Line 63, delete "each".

Column 27,
Line 5, delete "modest".
Line 40, delete "modest".
Line 44, replace "a" with -- said --.
Line 45, delete "modest".

Column 28,
Line 4, replace "17" with -- 18 --.
Line 34, replace "in carbon-fiber" with -- in said carbon-fiber --.

Signed and Sealed this

Eighteenth Day of September, 2001

Attest:

NICHOLAS P. GODICI
Attesting Officer *Acting Director of the United States Patent and Trademark Office*